United States Patent [19]

Yamada et al.

[11] Patent Number: 5,121,446
[45] Date of Patent: Jun. 9, 1992

[54] IMAGE PROCESSING APPARATUS CAPABLE OF OBTAINING MULTI-LEVEL DATA

[75] Inventors: Yasuhiro Yamada; Hiroshi Tanioka, both of Yokohama, Japan

[73] Assignee: Canon Kabushiki Kaisha, Tokyo, Japan

[21] Appl. No.: 731,380

[22] Filed: Jul. 16, 1991

Related U.S. Application Data

[63] Continuation of Ser. No. 476,618, Feb. 7, 1990, abandoned.

[30] Foreign Application Priority Data

Feb. 10, 1989 [JP] Japan ................................. 1-31411
Nov. 2, 1989 [JP] Japan ................................. 1-284879

[51] Int. Cl.⁵ ................................................ G06K 9/38
[52] U.S. Cl. ................................. 382/50; 382/52
[58] Field of Search .................... 382/50, 52; 358/455, 358/458, 456, 465, 466

[56] References Cited

U.S. PATENT DOCUMENTS

| | | | |
|---|---|---|---|
| 4,386,366 | 5/1983 | Mori | 358/465 |
| 4,393,452 | 7/1983 | Sekigawa | 382/50 |
| 4,468,704 | 8/1984 | Stoffel et al. | 358/466 |
| 4,601,056 | 7/1986 | Habitzreiter et al. | 382/50 |
| 4,677,479 | 6/1987 | Hatori et al. | 382/50 |
| 4,680,645 | 7/1987 | Dispoto et al. | 358/298 |
| 4,853,792 | 8/1989 | Katsuta et al. | 382/52 |
| 4,868,884 | 9/1989 | Miyazaki et al. | 382/50 |

*Primary Examiner*—Stephen Brinich
*Attorney, Agent, or Firm*—Fitzpatrick, Cella, Harper & Scinto

[57] ABSTRACT

An image processing apparatus includes an input unit for inputting data on an object pixel, a calculation unit for calculating an average density value of a predetermined area, and a quantization unit for converting the data on the object pixel into multi-level data on the basis of the average density value obtained by the calculation means.

32 Claims, 19 Drawing Sheets

FIG.1(1)

| f(i-2, j-1) | f(i-2, j) | f(i-2, j+1) |
|---|---|---|
| f(i-1, j-1) | f(i-1, j) | f(i-1, j+1) |
| f(i, j-1) | f(i, j) | f(i, j+1) |

FIG.1(2)

| B(i-2, j-1) | B(i-2, j) | B(i-2, j+1) |
|---|---|---|
| B(i-1, j-1) | B(i-1, j) | B(i-1, j+1) |
| B(i, j-1) | B(i, j) | |

FIG.1(3)

| R(2, 1) | R(2, 0) | R(2, -1) |
|---|---|---|
| R(1, 1) | R(1, 0) | R(1, -1) |
| R(0, 1) | R(0, 0) | R(0, -1) |

| 1 | 3 | 1 |
|---|---|---|
| 3 | 5 | 3 |
| 5 | 8 | 0 |

$\left[\times \frac{1}{3S}\right]$

S = 29

WEIGHTING MASK 1

| 1 | 3 | 5 | 3 | 1 |
|---|---|---|---|---|
| 3 | 5 | 7 | 5 | 3 |
| 5 | 7 | 10 |   |   |

$\left[\times \frac{1}{3S}\right]$

S = 58

WEIGHTING MASK 2

OUTPUT FROM COMP 10

$|f(i,j) - mo(i,j) - \frac{1}{6}R(0,0)|$

| 8 BIT | 1 | 0 |
|---|---|---|
| 0 | -12 | 12 |
| 1 | -11 | 11 |
| ⋮ | ⋮ | ⋮ |
| 23 | 11 | -11 |
| 24 | -12 | -12 |
| 25 | -11 | -13 |
| ⋮ | ⋮ | ⋮ |
| 47 | 11 | -25 |
| 48 | -12 | -26 |
| 49 | -11 | -27 |
| ⋮ | ⋮ | ⋮ |
| 71 | 11 | |
| 72 | 12 | |
| 73 | 13 | |
| ⋮ | ⋮ | |
| 93 | | -71 |
| 94 | | -72 |
| 95 | | 0 |
| ⋮ | | ⋮ |
| 131 | 71 | |
| 132 | 72 | |
| 133 | 0 | |
| ⋮ | ⋮ | |
| 255 | 0 | 0 |

FIG.7

| 9 | 25 | 9 |
|---|---|---|
| 26 | 44 | 26 |
| 44 | 72 | 0 |

| f(i-2,j-1) | f(i-2,j) | f(i-2,j+1) |
|---|---|---|
| f(i-1,j-1) | f(i-1,j) | f(i-1,j+1) |
| f(i,j-1) | f(i,j) | f(i,j+1) |

FIG. 8(2)

| B(i-2,j-1) | B(i-2,j) | B(i-2,j+1) |
|---|---|---|
| B(i-1,j-1) | B(i-1,j) | B(i-1,j+1) |
| B(i,j-1) | B(i,j) | |

FIG. 8(3)

| R(2,1) | R(2,0) | R(2,-1) |
|---|---|---|
| R(1,1) | R(1,0) | R(1,-1) |
| R(0,1) | R(0,0) | R(0,-1) |

| 1 | 3 | 1 |
|---|---|---|
| 3 | 5 | 3 |
| 5 | 8 | 0 |

$\left[\times \dfrac{1}{S}\right]$

| 1 | 3 | 5 | 3 | 1 |
|---|---|---|---|---|
| 3 | 5 | 7 | 5 | 3 |
| 5 | 7 | 10 | 0 | 0 |

$\left[\times \dfrac{1}{S}\right]$

| 5 | 3 | 1 | 3 | 5 |
|---|---|---|---|---|
| 3 | 7 | 5 | 7 | 3 |
| 1 | 5 | 10 | 0 | 0 |

$\left[\times \dfrac{1}{S}\right]$

| INPUT ADDRESS | OUTPUT E | Q |
|---|---|---|
| 0 | 12 | 0 |
| 1 | 11 | 0 |
| 2 | 10 | 0 |
| ⋮ | ⋮ | ⋮ |
| 23 | -11 | 0 |
| 24 | -12 | 0 |
| 25 | -13 | 0 |
| ⋮ | ⋮ | ⋮ |
| 93 | -71 | 0 |
| 94 | -72 | 0 |
| 95 | 0 | 0 |
| ⋮ | ⋮ | ⋮ |
| 255 | 0 | 0 |

| INPUT ADDRESS | OUTPUT E | Q |
|---|---|---|
| 256 | -12 | 1 |
| 257 | -11 | 1 |
| 258 | 10 | 1 |
| ⋮ | ⋮ | ⋮ |
| 279 | 11 | 1 |
| 280 | -12 | 2 |
| 281 | -11 | 2 |
| ⋮ | ⋮ | ⋮ |
| 303 | 11 | 2 |
| 304 | -12 | 3 |
| 305 | -11 | 3 |
| ⋮ | ⋮ | ⋮ |
| 327 | 11 | 3 |
| 328 | -12 | 3 |
| 329 | -11 | 3 |
| ⋮ | ⋮ | ⋮ |
| 287 | 71 | 3 |
| 288 | 72 | 3 |
| 289 | 0 | 3 |
| ⋮ | ⋮ | ⋮ |
| 511 | 0 | 3 |

IMAGE PROCESSING APPARATUS CAPABLE OF OBTAINING MULTI-LEVEL DATA

This application is a continuation of U.S. application Ser. No. 476,618 filed Feb. 7, 1990 now abandoned.

BACKGROUND OF THE INVENTION

1. Field of the Invention

The present invention relates to an image processing apparatus for quantizing image data into multi-level data such as ternary or quaternary data.

2. Related Background Art

Conventional halftone processing methods which are employed in image processing apparatuses, such as facsimile machines or digital copiers, include the error diffusion method and the average density approximation method.

The former method has been proposed, for example, from Page 36 to Page 37 in "An Adaptive Algorithm for Spatial Gray Scale", SID 75 Digest by R. Floyd & L. Steinberg. In this method, multi-level image data on an object pixel is binarized (converted into the highest density level or lowest density level). Thereafter, an error between the thus-obtained binary level and the multi-level image data which is not yet binarized is weighted, and this weighted error is added to data on the pixels in the vicinity of the object pixel.

The present assignee has already filed applications regarding the error diffusion method under several patent applications, now U.S. Pat. Nos. 4,876,610 (Ohsawa et al.), 4,878,125 (Katayama et al.) 5,008,950 (Katayama et al.), 4,958,236 (Nagashima et al.), 4,958,218 (Katayama et al.), 4,975,786 (Katayama et al.), and 4,958,238 (Katayama et al.) and pending U.S. application Ser. Nos. 07/192,601 and 07/270,809.

The latter method is disclosed in, for example, Japanese Unexamined Patent Publication (Kokai) No. 57-104369. In this method, weighted average values of the pixels in the vicinity of an object pixel when the object pixel is binarized into black and white levels are respectively obtained using the binary data on the pixels in the vicinity of the object pixel, and the image data on the object pixel is binarized using the average value of these two average values as a threshold.

The aforementioned error diffusion method involves correction of an error between image data which is input and image data which is output. As a consequence, the density of the input image and of the output image can be stored, and this enables provision of images which are excellent in both resolution and gradation.

However, in this error diffusion method, a large amount of data must be two-dimensionally calculated in order to correct the error between the input image data and the output image data, and this makes the hardware configuration very complicated.

SUMMARY OF THE INVENTION

The present invention is intended to eliminate the aforementioned drawbacks of the conventional techniques, and an object thereof is to provide an image processing apparatus that employs a reduced amount of data to be processed for multi-level conversion, which has a simple hardware configuration required for multi-level conversion, and which ensures that an image obtained has excellent gradation and resolution.

In order to achieve the above-described object, the present invention provides an image processing apparatus which comprises an input means for inputting data on an object pixel, a calculation means for calculating an average density value for a predetermined area, a multi-level conversion means for converting the data on the object pixel into multi-level data on the basis of the average density value obtained by the calculation means, and a correction means for correcting an error generated when the data on the object pixel is converted into the multi-level data.

The present invention also provides an image processing apparatus which comprises an input means for inputting data on an object pixel, a calculation means for calculating an average density value for a predetermined area, a multi-level conversion means for converting the data on the object pixel into multi-level data consisting of a plurality of bits on the basis of the average density value obtained by the calculation means, and a correction means for correcting an error generated when the data on the object pixel is converted into the multi-level data. The calculation means calculates the average density value for the predetermined area using data whose bit is smaller than that of the multi-level data consisting of the plurality of bits and obtained by the multi-level conversion means.

Another object of the present invention is to provide an image processing apparatus able to conduct multi-level conversion which ensures excellent gradation and resolution reproduction by a small-scale hardware configuration at a high speed.

Another object of the present invention is to provide an image processing apparatus whose hardware scale is independent from an increase in the bits of data to be processed for the multi-level conversion and thus facilitates expansion toward high-quality images.

Another object of the present invention is to provide an image processing apparatus which enables density of an image input and of an image output to be completely stored when the error diffusion method is employed because no division operations are required to diffuse an error and because no quantizing error occurs.

Another object of the present invention is to provide an image processing apparatus which is capable of the halftone process that can substitute for the error diffusion method at a low cost.

Another object of the present invention is to provide an image processing apparatus which enables pseudo contour generated by multi-level conversion in the error diffusion method to be prevented so as to ensure a high-quality image.

Another object of the present invention is to provide an image processing apparatus which is capable of reproducing the density of an image which is faithful to that of an original image utilizing the feature of a recording device.

The above and other objects, features and advantages of the present invention will be more apparent from the following description with reference to the accompanying drawings.

BRIEF DESCRIPTION OF THE DRAWINGS

FIGS. 1(1)–1(3) show multi-level image, quaternary image and a weighting mask for individual pixels;

FIG. 5(a)-5(b) show examples of the weighting mask;

FIG. 6 shows an example of a table stored in a ROM 12 shown in FIG. 4;

FIG. 7 shows the weighting mask which is converted into 8-bit data;

FIG. 8(1)-8(3) show multi-level image, quaternary image and a weighting mask for individual pixels;

FIG. 11A-11C show examples of the weighting mask employed in the second embodiment;

FIG. 12 shows an example of a table stored in a ROM 26 shown in FIG. 10;

DETAILED DESCRIPTION OF THE PREFERRED EMBODIMENTS

Embodiments of the present invention will now be described in detail with reference to the accompanying drawings.

First Embodiment

The principle of the image processing method which is employed in a first embodiment of the present invention will be described first. In this method, it is assumed that multi-level image data which is input is quantized into quaternary data.

Referring first to FIG. 1 (1), a reference symbol f (i, j) denotes multi-level density data (any value ranging between 0 to 1) on an input image at an object pixel which is to be quantized into quaternary data. Quaternarization has already been conducted on the pixels located above the broken line. After the quaternarization for the object pixel, the same processing will be conducted on the subsequent pixels in the order of f (i, j+1), f (i, j+2) . . .

In FIG. 1 (2) which shows quaternary image data, a reference symbol B (i, j) denotes a quaternarized density (which may be 0, $\frac{1}{3}$, $\frac{2}{3}$ or 1). Quaternarization has already been conducted on the pixels surrounded by the broken line at the time when the object pixel is processed. The data on these pixels are used to quaternarize the object pixel.

FIG. 1 (3) shows a weighting mask. In FIG. 1 (3), a reference symbol R denotes a weighting mask which is used to obtain an average density and which is expressed in a matrix of 3×3. The weight corresponding to the object pixel is R (0, 0). Also, R (0, −1)=0.

In the image processing method of the first embodiment, it is estimated that the object pixel is converted into four densities ranging from black to white, and average quaternary densities m0 (i,j), m1 (i, j), m2 (i, j), and m3 (i, j) of the vicinity of an object pixel in all the cases are obtained by the following equations:

$$m0(i, j) = \sum_{x=0}^{2} \sum_{y=-1}^{1} R(x, y) \cdot B(i - x, j - y) - E(i, j) \quad 1$$

where $B(i, j) = 0$ $$m1(i, j) = \sum_{x=0}^{2} \sum_{y=-1}^{1} R(x, y) \cdot B(i - x, j - y) - E(i, j) \quad 2$$

where $B(i, j) = \frac{1}{3}$ $$m2(i, j) = \sum_{x=0}^{2} \sum_{y=-1}^{1} R(x, y) \cdot B(i - x, j - y) - E(i, j) \quad 3$$

where $B(i, j) = \frac{2}{3}$ $$m3(i, j) = \sum_{x=0}^{2} \sum_{y=-1}^{1} R(x, y) \cdot B(i - x, j - y) - E(i, j) \quad 4$$

where $B(i, j) = 1$

Figure 2:
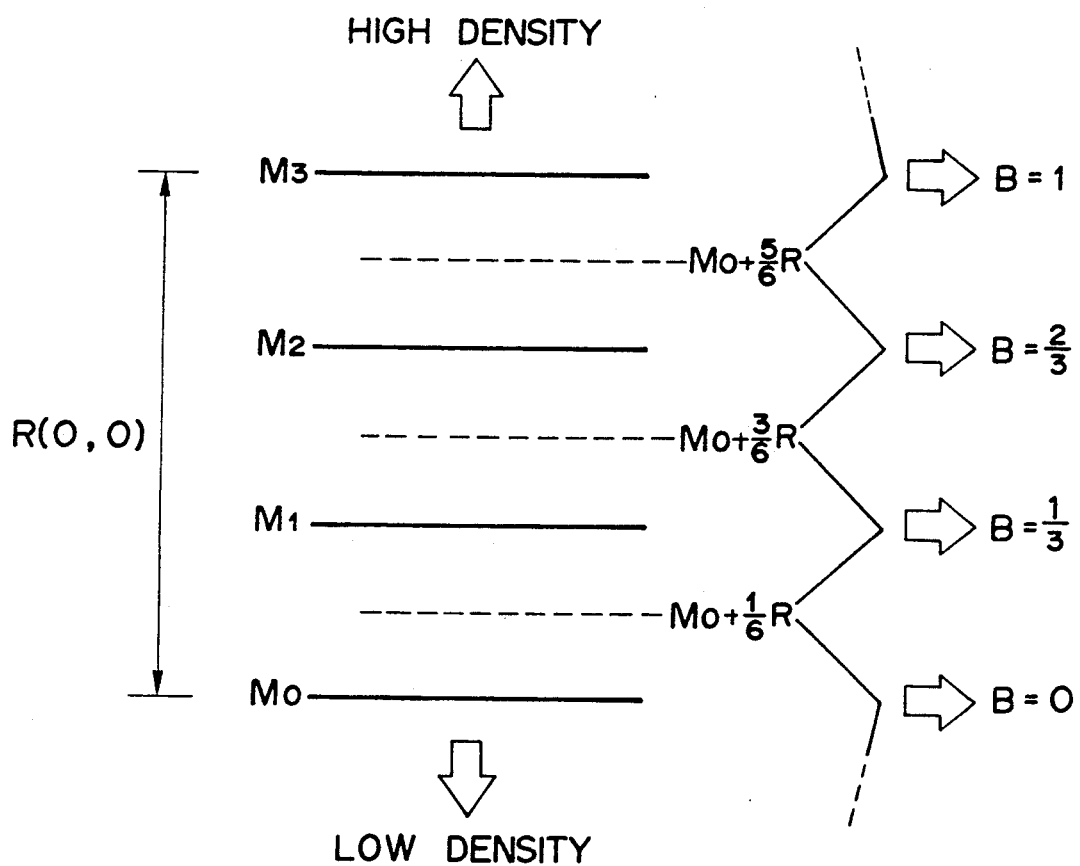
FIG. 2 illustrates the principle of multi-level conversion process employed in a first embodiment of the present invention.

FIG. 2 shows M0, M3, and B which are expressed by Equations (1) to (4). In the above Equations, E (i, j) denotes an error which is generated when the data f (i, j−1) on the pixel immediately before the object pixel is quaternarized, and which is corrected when the average value of the object pixel is operated.

The multi-level density data f (i, j) on the object pixel is quaternarized using the average densities m0, m1, m2 and m3 as follows:

When $f(i, j) \leq \frac{m0(i, j) + m1(i, j)}{2}$ $B(i, j) = 0, E(i, j + 1) = f(i, j) - m0(i, j) \quad 5$ When $\frac{m0(i, j) + m1(i, j)}{2} < f(i, j) \leq \frac{m1(i, j) + m2(i, j)}{2}$ $B(i, j) = \frac{1}{3}, E(i, j + 1) = f(i, j) - m1(i, j) \quad 6$ When $\frac{m1(i, j) + m2(i, j)}{2} < f(i, j) \leq \frac{m2(i, j) + m3(i, j)}{2}$ $B(i, j) = \frac{2}{3}, E(i, j + 1) = f(i, j) - m2(i, j) \quad 7$ When $\frac{m2(i, j) + m2(i, j)}{2} \leq f(i, j)$ $B(i, j) = 1, E(i, j + 1) = f(i, j) - m3(i, j) \quad 8$ The quaternarizing error E (i, j) is an error generated when the multi-level data f (i, j−1) on the pixel immediately before the object pixel is quaternarized. More specifically, to quaternarize the data f (i, j−1) is to approximate that data by either of the average densities m0 (i, j−1), m1 (i, j−1), m2 (i, j−1) and m3 (i, j−1) of the adjacent pixels, and in either case, an error occurs with respect to the data f (i, j−1) which is actually input.

In the image processing method of the first embodiment, a high halftone reproduction, which cannot be realized in the conventional average density approximation method, can be achieved, because the quaternarizing error E (i, j) generated in the pixel immediately before the object pixel is corrected when the average value of the object pixel is calculated, and quaternarization is conducted on the object pixel using that average value. In this way, optimal correction can be conducted on the individual levels of the quaternarizing image B (i, j), and quaternarized density of the image can be stored in a complete from over the entire area of the image input.

Furthermore, this image processing method assures excellent image reproduction even though the quantity of data to be processed is very small. This is because, even though correction of the error E generated by quaternarization is conducted on the adjacent single pixel, the average density values are obtained using the quaternary data, and this ensures the same effect as that provided when the error E is distributed to a plurality of pixels for correction.

Figure 3:
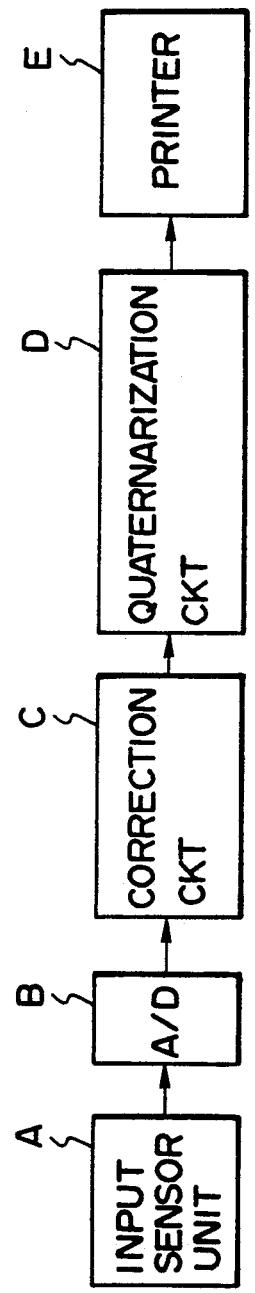
FIG. 3 is a block diagram of an image processing apparatus of the first embodiment.

FIG. 3 is a block diagram of the first embodiment of an image processing apparatus according to the present invention. An input sensor portion A is constructed by a photoelectric conversion element such as a CCD device, and a drive device for driving the photoelectric conversion element for scanning. The input sensor portion A reads an original. The image data on the original which is read by the input sensor portion A is sent to an A/D converter B in sequence, where the data on the individual pixels are converted into 8-bit digital data to obtain data representing any of 256 levels. Next, shading or the like is performed digitally by a correction circuit C to correct irregularities in the sensitivity of the CCD sensor or in the illumination of a light source. The corrected data is sent to a quaternarization circuit D where the 8-bit multi-level image data are converted into 2-bit quaternary data by the aforementioned image processing method. A printer E is a multi-level printer which is capable of reproducing an image on a sheet of paper on the basis of the quaternary data sent from the quaternarization circuit D.

Figure 4:
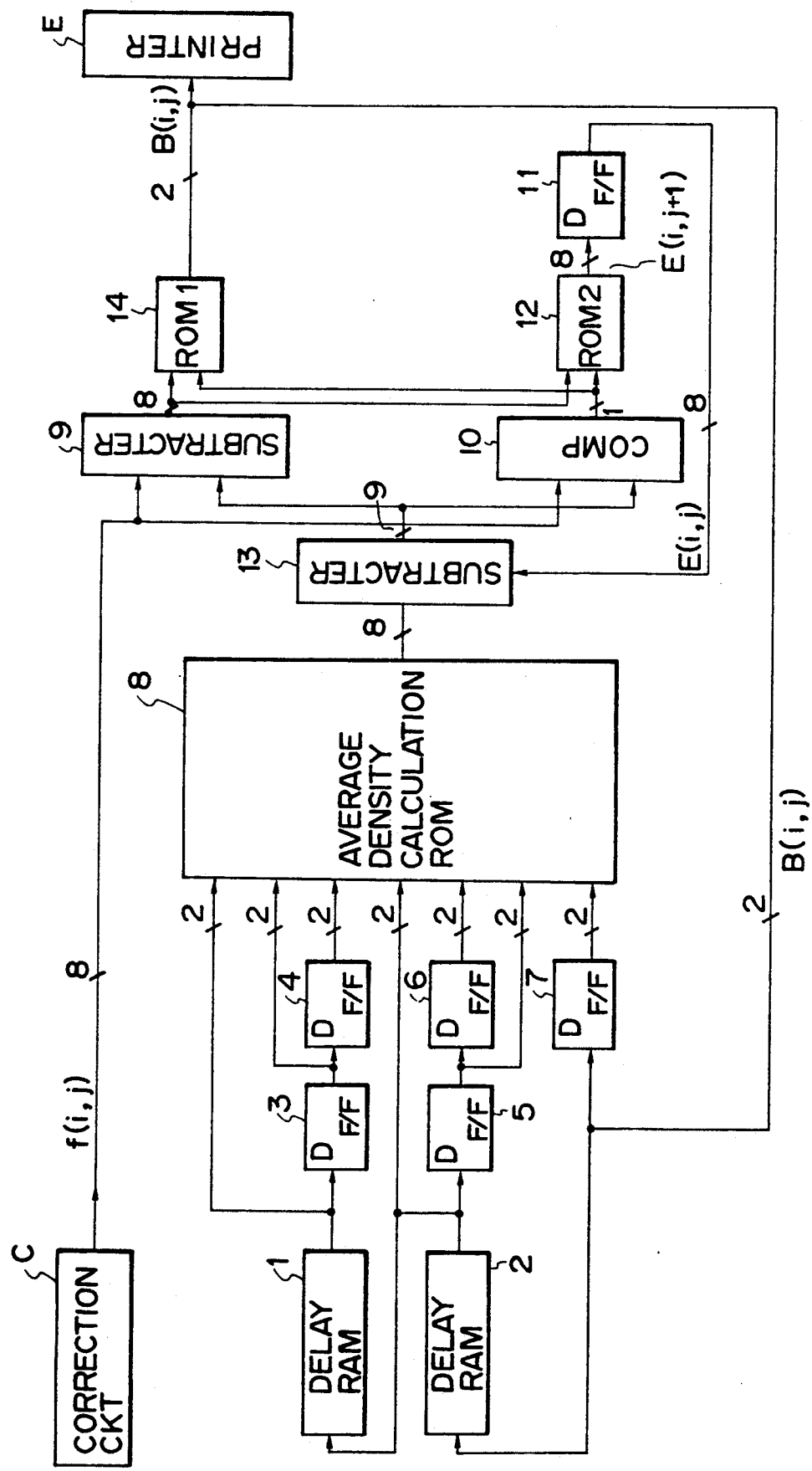
FIG. 4 is a block diagram of a quaternarization circuit of the image processing apparatus of FIG. 3.

FIG. 4 is a block diagram of the quaternarization circuit D shown in FIG. 3. The quaternarization circuit D is composed of delay RAMs 1 and 2 for storing the quaternary data in a quantity of one line, DF/Fs (flip-flops) 3 to 7 and 11 for delaying the quaternary data by one clock pulse corresponding to one pixel, an average density calculation ROM 8 for calculating the average density of the pixels in the vicinity of the object pixel and outputting a threshold, a substracter 9 for calculating the difference between the input multi-level data on the object pixel and the threshold, a comparator 10 for comparing the threshold which is output from the ROM 8 with the multi-level data on the object pixel, a DF/F 11, a ROM 12 for calculating error data which is to be corrected when the data which is input subsequent to that on the object pixel is quantized into multi-level data, a subtracter 13 for subtracting the error E generated when quaternarization is conducted on the pixel immediately before the object pixel from the average density value output from the ROM 8, and a ROM 14 for determining quaternary data on the basis of the output of the subtracter 9 and that of the comparator 10.

Turning to FIG. 5, a weighting mask 1 is a mask used to obtain the average density value from the quaternary data on the total of 9 pixels including the object pixel. S is a value use to normalize the total of the weighting mask to 1. In the case of the weighting mask 1, S=29. The weighting mask 1 shown in FIG. 5 is multiplied by $$\frac{1}{3S}$$

to convert the 2-bit quaternary data which is stored in the delay RAMs 1 and 2 in the DF/Fs 3 to 7 shown in FIG. 4 and which represents 0, 1, 2 and 3 into 0, $\frac{1}{3}$, $\frac{2}{3}$ and 1 expressed in Equations (1) to (4).

A weighting mask 2 is a modification of the weighting mask 1, which is used to calculate the average density value from the quaternary data on the total of 15 pixels including the object pixel.

In the thus-arranged quaternarization circuit 4, the quaternarizing data B (i, j) is output relative to the input image data f (i, j), and the quaternarizing data B (i, j) is input to the delay RAM 2 and the DF/F 7. The quaternarizing data is delayed by one line by the RAM 2 to obtain the quaternary data B (i−1, j+1) and by two lines by the RAM 1 to obtain the quaternary data B (i−2, j+1). The output of the dalay RAM 2 is input to the DF/F 5 to obtain the quaternary data B (i−1, j), and the output of the DF/F 5 is then input to the DF/F 6 to obtain the quaternary data B (i−1, j−1). Similarly, the output of the daley RAM 1 is input to the DF/F 3 to obtain the data B (i−2, j), and the output of the DF/F 3 is then output to the DF/F 4 to obtain the data B (i−2, j−1). The quaternarizing data B (i, j) is input to the DF/F 7 to obtain the data B (i, j−1). The thus-obtained quaternary data are quaternary image signals in the vicinity of the input image f (i, j), as shown in FIG. 1. These quaternary data are input to input addresses of the ROM 8 to obtain the threshold $$M_0 = \frac{1}{6} R$$

shown in FIG. 2 on the basis of Equations (1) and (2).

Equations (2), (3) and (4) are deformed using Equations (1) as follows:

$$m1(i,j) = m0(i,j) + \tfrac{1}{3}R(0,0) \qquad (9)$$

$$m2(i,j) = m0(i,j) + \tfrac{2}{3}R(0,0) = m1(i,j) + \tfrac{1}{3}R(0,0) \qquad \ldots$$

$$m3(i,j) = m0(i,j) + R(0,0) = m2(i,j) + \tfrac{1}{3}R(0,0) \ldots$$

Hence, determination of the average quaternarizing density m0 (i,j) determines m1 (i,j), m2 (i,j) and m3 (i, j). In other words, the ROM 8 outputs the quaternarizing threshold which is expressed by the first term of the right hand side of the following Equation (12).

$$\frac{m0(i,j) + m1(i,j)}{2} = \left\{ \sum_{x=0}^{2} \sum_{y=-1}^{1} R(x, y) \cdot B(i - x, j - 1y) + \frac{1}{6} R(0, 0) \right\} - E(i, j) \qquad 12$$

The quaternarizing error E(i, j) is subtracted from the output of the ROM 8 by the subtracter 13. The first term of the right hand side of Equation (12) corresponds to the threshold $$M_0 = \frac{1}{6} R$$

shown in FIG. 2. This threshold is output to both the comparator 10 and the subtracter 9. The subtracter 9 calculates the difference between the two sides of the inequality in Equation (5) and outputs the absolute value thereof to clarify how different the data f(i, j) and the threshold $$M_0 = \frac{1}{6} R$$

shown in FIG. 2 are.

The comparator 10 outputs to the ROMs 12 and 14 data indicating whether f (i, j) is larger or smaller than the threshold $$M_0 = \frac{1}{6} R.$$

The ROM 14 outputs quaternary data B (i, j) using the output of the subtracter 9 (which indicates how different f (i, j) and $$M_0 = \frac{1}{6} R$$

are) and that of the comparator 10 (which indicates as to whether f (i, j) is larger than $$M_0 = \frac{1}{6} R).$$

Equation (5) is deformed using Equations (1), (9) and (12) as follows:

When $f(i, j) \leq m0(i, j) + \frac{1}{6} R(0, 0)$ $$B(i,j) = 0, \ E(i,j+1) = f(i,j) - m0(i,j) \ldots \quad (5)'$$

Similarly, Equations (6), (7) and (8) are deformed as follows:

When $m0(i, j) + \frac{1}{6} R(0, 0) \leq f(i, j) < m0(i, j) + \frac{3}{6} R(0, 0)$ $$B(i, j) = \tfrac{1}{3}, \ E(i, j + 1) = f(i, j) - m0(i, j) - \tfrac{1}{3}R(0, 0) \quad 6'$$

When $m0(i, j) + \frac{3}{6} R(0, 0) \leq f(i, j) < m0(i, j) + \frac{5}{6} R(0, 0)$ $$B(i, j) = \tfrac{2}{3}, \ E(i, j + 1) = f(i, j) - m0(i, j) - \tfrac{2}{3}R(0, 0) \quad 7'$$

When $m0(i, j) + \frac{5}{6} R(0, 0) \leq f(i, j)$ $$B(i,j) = 1, \ E(i,j+1) = f(i,j) - m0(i,j) - R(0,0) \ldots \quad (8)$$

Since the weighting R (0, 0) is known in the above Equations, an error E (i, j+1) associated with the average density value can thus be easily obtained by connecting the output of the subtracter 9 and that of the comparator 10 to the input address terminal of the ROM 12 using the translation table stored in the ROM 12. Also, the quaternarizing data B (i, j) can be similarly defined using the translation table which is stored in the ROM 14 by connecting the output of the subtracter 9 and that of the comparator 10 to the input address terminal of the ROM 14, as stated above.

The DF/F 11 delays the error E (i, j+1) by 1 clock pulse.

FIG. 6 shows an example of the table stored in the ROM 12. This example employs the weighting mask 1 shown in FIG. 5. So, the values in the average density calculation ROM table are 8-bit data obtained by multiplying the values obtained by Equations (1) to (4) by 255 and normalized to an actually input 8-bit image density level (representing any value ranging from 0 to 255). In that case, the weighting mask 1 takes the form shown in FIG. 7. In the table shown in FIG. 6, when the output of the subtracter 13

$$\left| f(i, j) - m0(i, j) - \frac{1}{6} R(0, 0) \right|$$

is equal to or greater than a certain value (which is 133 when the output of the comparator 10 is 1, or 95 when the output of the comparator 10 is 0), the error E is made 0 so as to determine that portion as an edge portion and thereby restrict reduction in the resolution which would otherwise occur by the storage of the density when the error between the input data f (i, j) and the average density value is large.

The hardware structure of this embodiment can be constructed by several RAM, ROM and operation IC chips in a small scale, as shown in FIG. 4. Furthermore, in this embodiment, multi-level density data which is input is quantized into quaternary data. However, ternarization of the multi-level density data is also possible by changing the translation tables stored in the ROMs 12 and 14. Furthermore, if the number of input addresses of the ROMs 12, 14 and of the RAMs 1 and 2 is increased, the number of levels can be further increased without expanding the hardware configuration shown in FIG. 4.

Quantization of the image data into multi-level data which is performed in the first embodiment ensures reproduction of excellent gradation and resolution. Such quantization can be performed by the small-scale hardware configuration at a high speed.

Furthermore, in this embodiment, since the number of bits of data required to process for multi-level density expression can be increased without increasing the size of the hardware, expansion toward high-quality images can be realized easily.

Furthermore, the present embodiment requires no division operations, which would be required to diffuse an error in a case where the error diffusion method is employed. In consequence, no quantizing error occurs, and the density of the input image and of the output image can be stored in a complete form.

The present embodiment employs the weighting mask 1 shown in FIG. 5. However, the weighting mask 2 having dimensions of 3×5 pixels may also be used. In that case, the average value calculation area is expanded, so reproduction of the gradation information and of the resolution information can be further improved.

Pixels on which correction of the error E associated with the average value density is conducted are not limited to a single pixel but the error may be distributed to a plurality of pixels. For example, $\frac{2}{3}$E (i, j+1) may be corrected when f (i, j+1) is quantized into a multi-level density and the remaining $\frac{1}{3}$E (i, j+1) may be corrected when f (i, j+2) is quantized into a multi-level density. In this way, reproduction of gradation can be improved, even though the averaging weighting mask employed is small. Furthermore, the error E may be two-dimensionally distributed to a plurality of adjacent pixels in a predetermined distribution ratio. In this way, reproduced image can be prevented from exhibiting uniform directionality as compared with the case where the error E is one-dimensionally distributed.

Either of the weighting masks 1 and 2 is arranged such that it increases as it approaches the object pixel. However, gradient/distribution of the weighting mask is not limited to this. Furthermore, matrix may be constructed by pixels which are separated from the object pixel.

In this embodiment, correction of the error E is conducted on the average density m. However, the same result can be obtained by conducting correction of the error E on the input image data in the following manner.

$$m_n(i,j) = \sum_{x=0}^{2} \sum_{y=-1}^{1} R(x,y) \cdot B(i-x, j-y)$$

$(n = 0, 1, 2, 3)$ $\left(\text{where } B(i,j) = \frac{n}{3}\right)$ $f'(i,j) = f(i,j) + E(i,j)$ f'(i,j) data on which error correction is conducted
f(i,j) data on which error correction is not yet conducted Second Embodiment The aforementioned first embodiment is arranged such that 2-bit data is temporarily stored in the delay RAMs 1 and 2 and the DF/Fs 3 to 7 to calculate the average density value.

In a second embodiment, upper one bit in the 2-bit data is stored so as to achieve an increased processing speed and saving of the memory capacity.

First, the principle of the image processing method employed in the second embodiment will be described. In this method, it is assumed that multi-level density data is quantized into quaternary data.

In FIG. 8, a reference symbol f (i, j) denotes multi-level density data (representing any value ranging from 0 to 1) on an input image which is located at an object pixel to be quaternarized. Quaternarization has already been conducted on the pixels located above the broken line. After the object pixel has been quaternarized, quaternarization is conducted on the subsequent pixels in sequence in the order of F (i, j+1), f (i, j+2) . . . A reference symbol B (i, j) denotes upper bit data (1 or 0) of the quaternary data (in 2 bits) obtained by quaternarizing the object pixel. A reference symbol R denotes a weighting mask used to obtain average density. In this example, the weighting mask has dimensions of 3×3, and the weight corresponding to the object pixel is R (0, 0). Also, R (0, −1)=0.

In this image processing method, the average density M (i, j) at the object pixel is obtained by the following equation.

$$M(i,j) = \sum_{x=0}^{2} \sum_{y=-1}^{1} R(x,y) \cdot B(i-x, j-y) \qquad 13$$

The quaternarizing average values $M_0$ (i, j), $M_1$ (i, j), $M_2$ (i, j) and $M_3$ (i, j) for the quaternary data (Q (i, j)=0, $\frac{1}{3}$, $\frac{2}{3}$, 1) that can be provided by quaternarization of the density at the object pixel are obtained as follows:

$$M_0(i,j) = \sum_{x=0}^{2} \sum_{y=-1}^{1} R(x,y) \cdot B(i-x, j-y) \qquad 14$$

where $Q(i,j) = 0$ $M_1(i,j) = M_0(i,j) + \frac{1}{3}R(0,0)$ where $Q(i,j) = \frac{1}{3}$ ...

$M_2(i,j) = M_0(i,j) + \frac{2}{3}R(0,0)$ where $Q(i,j) = \frac{2}{3}$ ...

$M_3(i,j) = M_0(i,j) + R(0,0)$ where $Q(i,j) = 1$ ...

The quaternarizing thresholds are obtained from these average values by the following equations.

$$\frac{M_0(i,j) + M_1(i,j)}{2} = M_0(i,j) + \frac{1}{6} R(0,0) \qquad 18$$

$$\frac{M_1(i,j) + M_2(i,j)}{2} = M_0(i,j) + \frac{3}{6} R(0,0) \qquad 19$$

$$\frac{M_2(i,j) + M_3(i,j)}{2} = M_0(i,j) + \frac{5}{6} R(0,0) \qquad 20$$

Hence, the object pixel f (i,j) is quaternarized using the thus-obtained thresholds as follows:

When $f(i,j) + E(i,j) \leq M_0(i,j) + \frac{1}{6} R(0,0)$ \qquad 21

$Q(i,j) = 0$, $E(i,j+1) = f(i,j) + E(i,j) - M_0(i,j)$

When $M_0(i,j) + \frac{1}{6} R(0,0) < f(i,j) + E(i,j) \leq M_0(i,j) + \frac{3}{6} R(0,0)$ $Q(i,j) = \frac{1}{3}$, $E(i,j+1) = f(i,j) + E(i,j) - M_0(i,j) - \frac{1}{3}R(0,0)$..

When $M_0(i,j) + \frac{3}{6} R(0,0) < f(i,j) + E(i,j) \leq M_0(i,j) + \frac{5}{6} R(0,0)$ $Q(i,j) = \frac{2}{3}$, $E(i,j+1) = f(i,j) + E(i,j) = M_0(i,j) - \frac{2}{3}R(0,0)$..

When $M_0(i,j) + \frac{5}{6} R(0,0) < f(i,j) + E(i,j)$ $Q(i,j) = 1$, $E(i,j+1) = f(i,j) + E(i,j) - M_0(i,j) - R(0,0)$...

Figure 9:
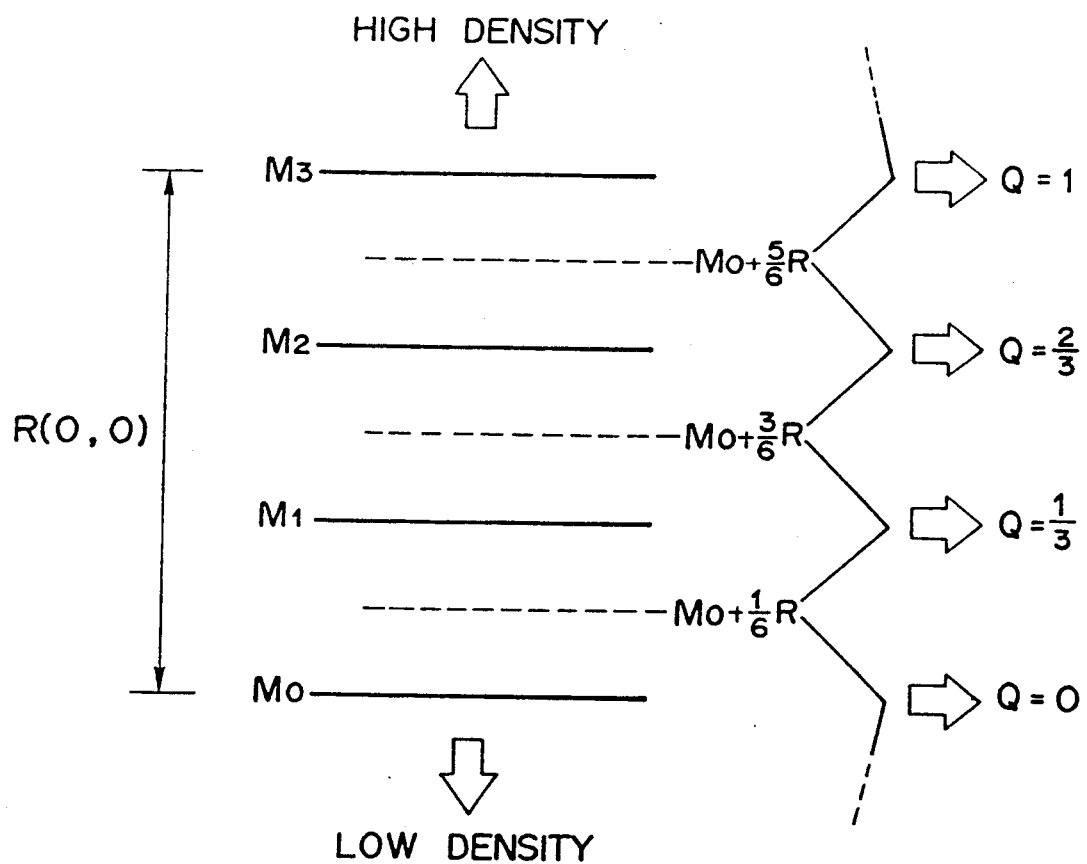
FIG. 9 illustrates the principle of multi-level conversion process employed in a second embodiment of the present invention.

FIG. 9 shows the relation between the $M_0$ to $M_3$, the quaternarizing thresholds and the quaternary data Q, which are obtained by Equations    to   . The quaternarizing error E (i, j) is an error generated when the pixel f (i, j−1) immediately before the object pixel is quaternarized. More specifically, quaternarization of the input pixel f (i, j+1) means approximation of that pixel by either of the average densities $M_0$ (i, j), $M_1$ (i, j), $M_2$ (i, j) and $M_3$ (i, j), and in either case, an error is generated with respect to the input image f (i, j) when it is quaternarized.

In this image processing method, halftone reproduction is greatly improved because the quaternarizing error E (i, j) is added to the subsequent pixel f (i, j) and quaternarization is conducted on a corrected object pixel. In this way, optimal correction can be performed on the individual levels of the quaternarizing data Q (i, j), and the quaternarized density can be stored over the entire image area which is input.

Figure 10:
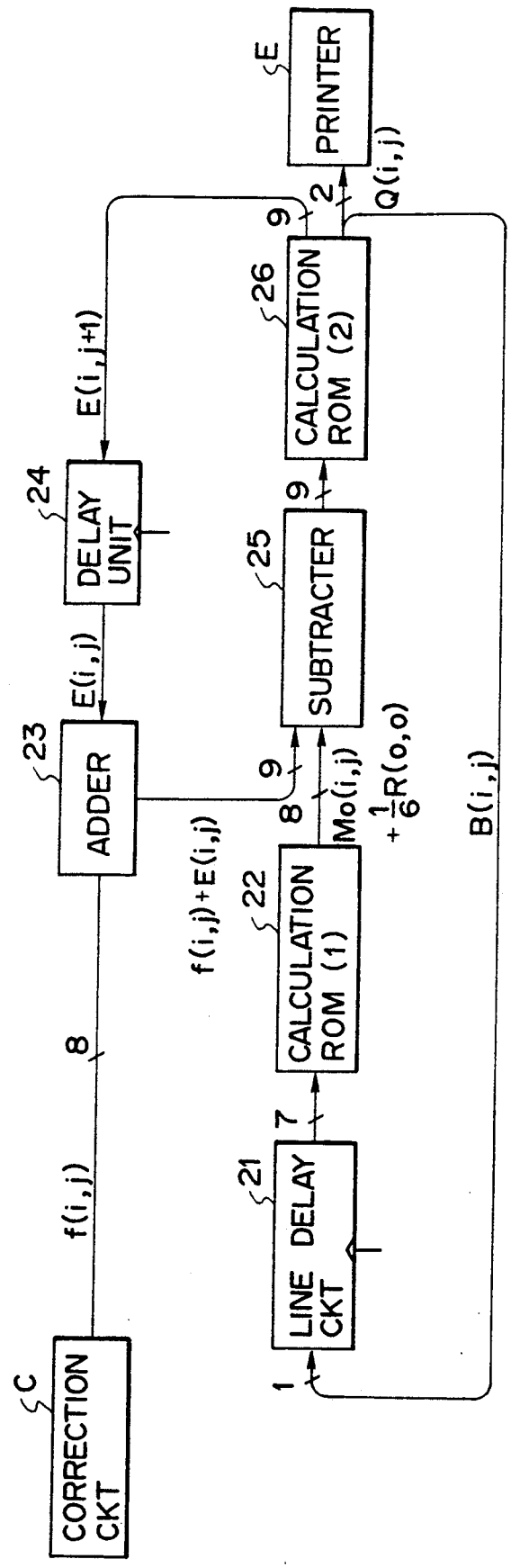
FIG. 10 is a block diagram of a quaternarization circuit in the second embodiment.

FIG. 10 is a block diagram of the quaternarization circuit D in the second embodiment, and FIG. 11 shows examples of the weighting mask, like FIG. 5.

In FIG. 10, reference numerals 21 and 22 respectively denote a line delay circuit and a calculation ROM which are associated with calculation of the average density value for the pixels in the vicinity of the object pixel on the basis of the quaternarized pixel data. Only upper one bit in the quaternarizing data (in 2 bits) on the preceding pixel is input to the line delay circuit 21. The delay circuit 21 delays the input data each time quaternarization is completed by a clock which is input to the delay circuit 21 from a synchronizing circuit (not shown). The delay circuit 21 is constructed such that it can delay two lines of data, so it outputs to the calculation ROM 22 binary data (B) on the pixels in the vicinity of the object pixel which is surrounded by the broken line in FIG. 8. Once the calculation ROM 22 receives the data at its input address, the ROM 22 conducts high-speed table translation on the data on the basis of Equations     and     to output quaternarizing thresholds.

Correction of the quaternarizing error E (i, j) is conducted on the density data f (i, j) of the object pixel by an adder 23. The output of the adder 23 and the output of the calculation ROM 22 are input to a subtracter 25 to calculate the difference between the two sides of the inequality in Equation    . Hence, by connecting the output of the subtracter 25 to the input address terminal of the calculation ROM 26, the quaternarized data Q (i, j) is easily obtained by means of the table translation which is conducted by the ROM 26 on the basis of Equations    to    as shown in FIG. 9. Furthermore, since the weight R (0, 0) corresponding to the object pixel is known from the weighting mask (shown in FIG. 11A) employed in the present embodiment, the quaternarizing error E (i, j) between the input image data and the average density value M, which features this image processing method, is also obtained by the table translation conducted by the ROM 26.

FIG. 12 shows an example of the table stored in the ROM 26. The data stored in the table are 8-bit data. The weighting mask shown in FIG. 7 is employed. FIG. 13 shows the form of data which is input to the ROM 26 as address data and that of data which is output from the ROM 26.

8 bits in the address data indicate how different the input data (on which correction of the error generated in the preceding pixel has been conducted) and the $$M_0 + \frac{1}{6} R$$

shown in FIG. 9 are, and 1 bit in the address data indicates whether the input data is larger or smaller than $$M_0 + \frac{1}{6} R.$$

In other words, in FIG. 12, an input address ranging from 0 to 255 indicates that the input data is smaller than $$M_0 + \frac{1}{6} R,$$

and the quaternarized output Q is 0. Regarding the error E, since R (0, 0) is equal to 72, as shown in FIG. 9, $$\frac{1}{6} R = 12.$$

So, the error E is output in the manner shown in FIG. 12.

On the other hand, an input address which is between 256 to 511 indicates that the input data is larger than $$M_0 + \frac{1}{6} R,$$

and the quaternarized output Q is either 1, 2 or 3, depending on the magnitude thereof.

In FIG. 12, when the input address is larger than 95 and 289, the error E is made 0 so as to determine that portion as an edge portion and thereby restrict reduction in the resolution which would otherwise occur by the storage of the density when the error between the input data f (i, j) and the average density value is large.

The error E (i, j) which is output from the ROM 26 is delayed by 1 clock pulse by a delay unit 24 which is composed of a DF/F, and the delayed error is output to the adder 23.

Thus, the density data on the individual pixels are quaternarized in sequence in the aforementioned procedures.

The calculation ROMs 22 and 26 store values calculated beforehand on the basis of the individual Equations, and output the value which is determined by the input address value.

The hardware configuration employed in the second embodiment is composed of several chip ICs, as shown in FIG. 10, and is very small in size as compared with the conventional one. Also, when compared with the first embodiment, a high-speed processing is possible because of a reduced number of bits used to obtain the average density.

Furthermore, if the average value calculation area is set to 3×5 pixels, as shown in FIG. 11 B, reproduction of gradation can be improved, and reproduction of the resolution, which is required for character documents, can also be improved.

In this image processing method, as shown in FIG. 11C, excellent resolution information reproduction can be attained in an image whose density varies rapidly, such as a character document, by making the weights corresponding to the pixels located slantingly relative to the object pixel larger than those corresponding to the other pixels in the same weighting mask area.

Furthermore, the weights increase as they approach the object pixel. However, gradient or distribution of the weights is not limited to that shown in FIG. 11. Furthermore, weights for the pixels which are separated from the object pixel may also be employed.

Furthermore, pixels on which correction of the error E of the average density value is conducted are not limited to a single pixel but the error may be distributed to a plurality of pixels. For examples, $\frac{2}{3}$ E (i, j+1) may be corrected when f (i, j+1) is quantized while the remaining $\frac{1}{3}$ E (i, j+1) may be corrected when f (i+1, j)

is quantized. In this way, gradation reproduction can be improved, even though the average value processing area is decreased.

In the second embodiment, correction of the error E is conducted on the object pixel density f (i, j). However, the same result can be obtained by conducting it on the average density M (i, j) as follows:

$$M(i,j) = \sum_{x=0}^{2} \sum_{y=-1}^{1} R(x,y) \cdot B(i - x, j - y) - E(i,j)$$

Furthermore, in both the first and second embodiments, only one type (one color) of input data is employed. However, the present invention is also applicable to a color image processing apparatus by employing input data representing three colors of r, G, and B.

The second embodiment has the following advantages.

(1) No division operations required for the error diffusion method are necessary, and this eliminates quantizing errors and makes storage of the densities over the entire image area possible.

(2) The hardware configuration is small in size. However, smooth gradation reproduction and image reproduction as high as or higher than that of the error diffusion method are achieved.

(3) The number of bits of data requires for the calculation of average density value is small, and this allows the data delaying circuit to be readily constructed by a shift register or a delay RAM. Furthermore, the number of input addresses for the table translation ROM is small, and an inexpensive ROM having a small capacity can thereby be employed. Hence, the overall apparatus has a simple structure and can be manufactured at a low cost.

Third Embodiment

Figure 14:
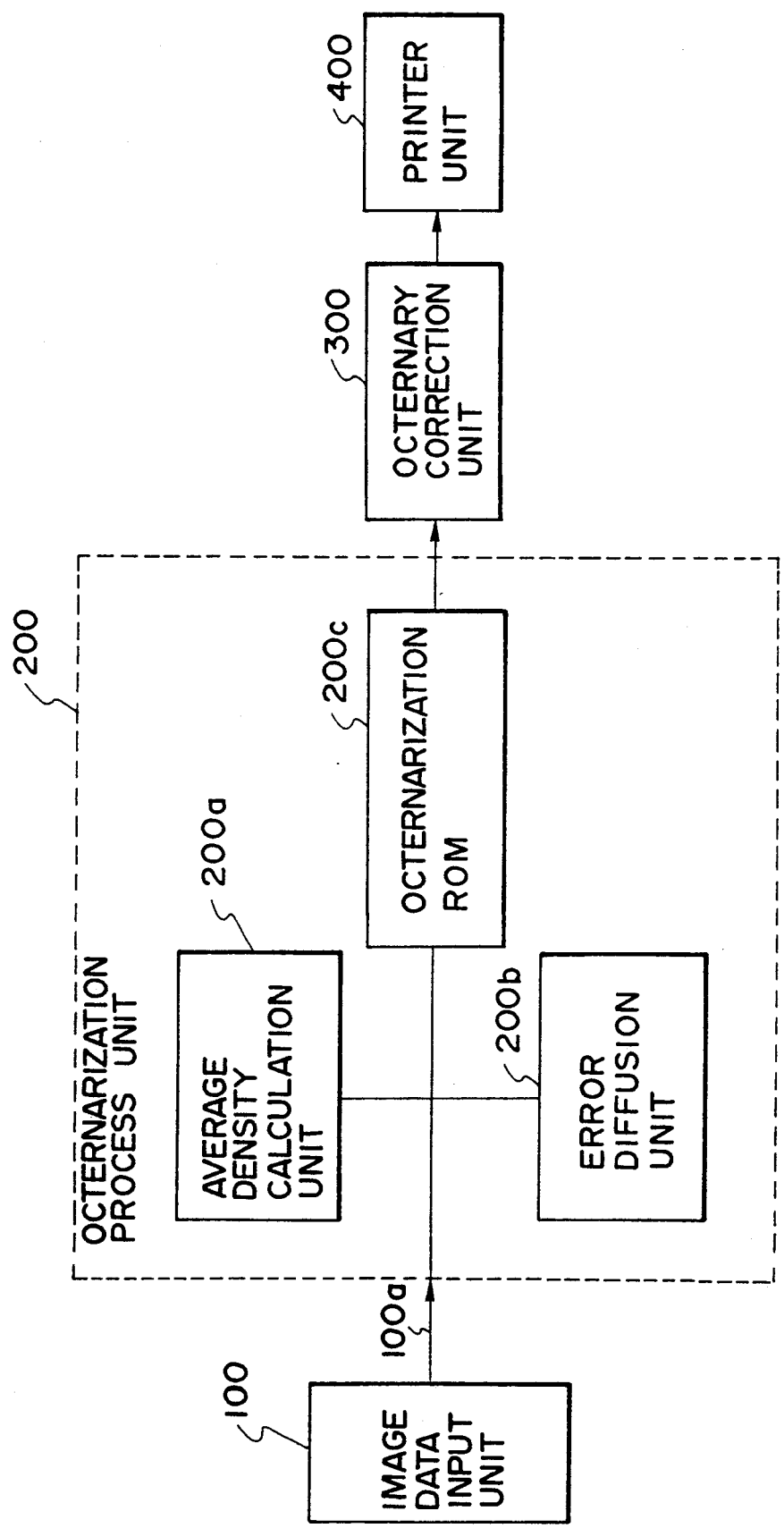
FIG. 14 is a block diagram of a third embodiment of an image processing apparatus according to the present invention.

FIG. 14 is a block diagram of a third embodiment of the image processing apparatus according to the present invention.

Multi-level image data 100a, such as image data read from an original document, is input through an image data input unit 100 to an octernarization process unit 200 and is quantized into octernary data so as to achieve the pseudo halftone process. The resulting octernary data is corrected by an octernary correction unit 300 so that it is suited to a printer, and is then output to a printer 400. The octernarization process unit 100 includes an average density calculation unit 200a which conducts the process based on the average density approximation method and an error diffusion unit 200b which conducts the process based on the error diffusion method. The octernarization process unit 100 also includes an octernarization ROM 200c which performs octernarization. Hereinafter, the image processing method employed in this embodiment is called the octernarization average density storage method.

Principle of Octernarization Average Density Storage Method

The principle of the octernarization average density storage method employed in the third embodiment will be described below in detail with reference to FIG. 15.

In this method, multi-level data f (i, j) (representing any value between 0 and 255) which is input to be octernarized is octernarized by obtaining for each pixel a weighted average value m (i, j) from a plurality (12 pieces in FIG. 2) of octernary data B (i, j) (representing any value ranging from 0 to 7), which are located in the vicinity of the input multi-level data f (i, j) and which have already been octernarized, and predetermined weighting masks R (x, y) using Equation and then by determining 7 thresholds on the bas of the obtained average value m (i, j). At the same time, a difference between the average density value which is obtained by the octernarization and the input multi-level data (precisely, the multi-level data on which correction, which will be described later, has been conducted), i.e., an octernarizing error, is distributed to the multi-level data on the adjacent pixels which are going to be octernarized, and then corrected. This processing cycle is repeated for each pixel in the octernarization average density storage method.

$$m(i,j) = \sum_{x=-2}^{2} \sum_{y=-2}^{0} \{R(x,y) \times B(i + x, j + y)\}$$

In the case of an example shown in FIG. 15, the average value m (i,j) for the object multi-level data 115 is obtained by means of the multiplication/addition calculation from the 12 pieces of octernary data and the weighting masks as follows:

$$m(i,j) = (0 \times 2 + 1 \times 1 + 3 \times 3 + 1 \times 4 + 0 \times 7) +$$
$$(1 \times 2 + 3 \times 2 + 5 \times 4 + 3 \times 6 + 1 \times 5) +$$
$$(3 \times 1 + 5 \times 4) = 98$$

Assuming that the octernary data which have been referred all represent the highest density level 7, the total sum thereof equals the value obtained by multiplying the total sum of the weighting masks R (x, y) by 7, i.e., 26×7=182. Hence, in a case where the object pixel is octernarized to the highest density level 7, 182 is made to correspond to the highest density level 255 of the input multi-level data and the average density value including the octernary data on the object pixel is obtained by distributing 73=255−182 in accordance with the octernary level of the object pixel, as shown in Table 1.

TABLE 1

| B (i, j) | Average Density |
|---|---|
| 0 | m (i, j) + 0 |
| 1 | m (i, j) + 10 |
| 2 | m (i, j) + 21 |
| 3 | m (i, j) + 31 |
| 4 | m (i, j) + 42 |
| 5 | m (i, j) + 52 |
| 6 | m (i, j) + 63 |
| 7 | m (i, j) + 73 |

Figure 15:
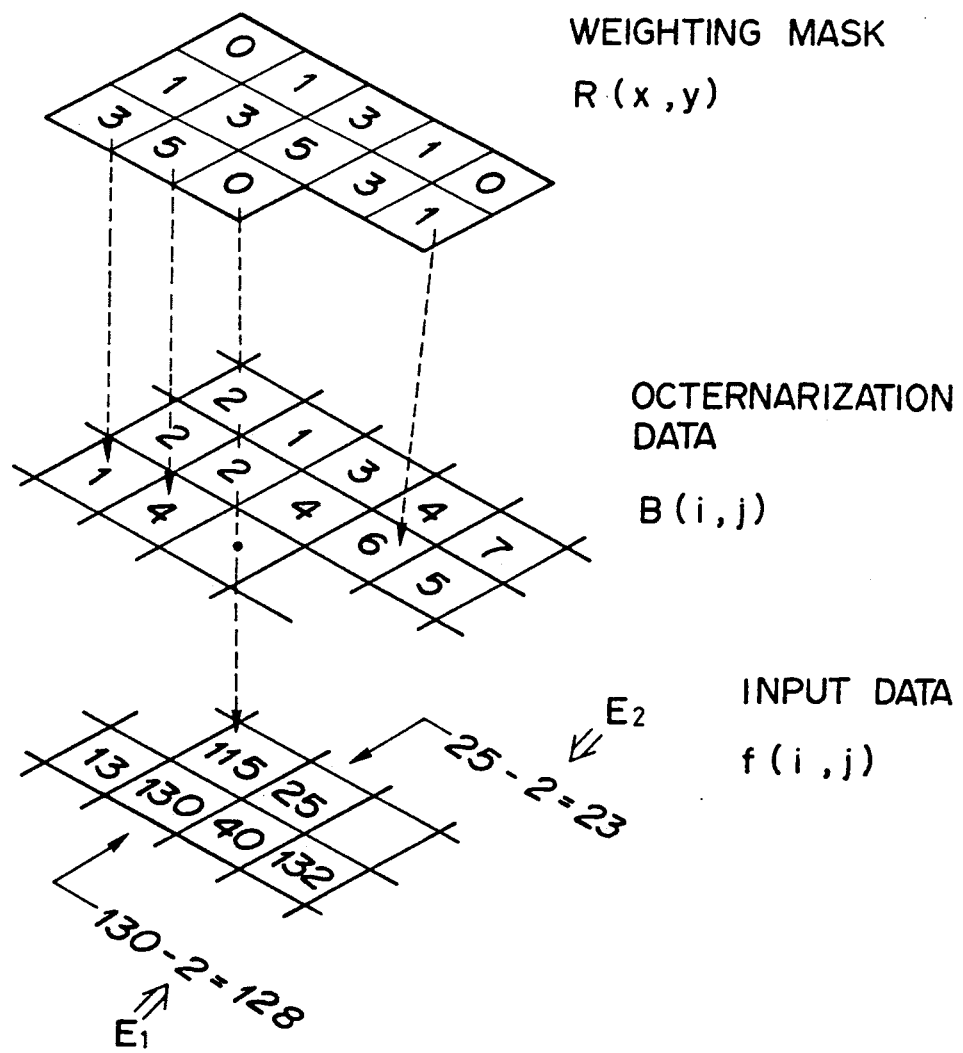
FIG. 15 illustrates the principle of the octernarization process employed in the third embodiment.

In the case of the example shown in FIG. 15, octernarization is to determine the average density in the aforementioned 8 types of average densities to which the input multi-level data 115 is closest. Hence, 7 pieces of thresholds Th0 to Th6 are determined as follows.

TABLE 2

| Threshold | |
|---|---|
| Th0 | m (i, j) + 5 |
| Th1 | m (i, j) + 15 |
| Th2 | m (i, j) + 26 |
| Th3 | m (i, j) + 36 |
| Th4 | m (i, j) + 47 |
| Th5 | m (i, j) + 57 |

TABLE 2-continued

| Threshold | |
|---|---|
| Th6 | m (i, j) + 68 |

The determination is conducted in the manner expressed by Equation as follows:

when $f(i,j) + E(i,j) \leq Th_0$  $B(i,j) = 0$   (26)

When $Th_0 < f(i,j) + E(i,j) \leq Th_1$  $B(i,j) = 1$

When $Th_1 < f(i,j) + E(i,j) \leq Th_2$  $B(i,j) = 2$

When $Th_2 < f(i,j) + E(i,j) \leq Th_3$  $B(i,j) = 3$

When $Th_3 < f(i,j) + E(i,j) \leq Th_4$  $B(i,j) = 4$

When $Th_4 < f(i,j) + E(i,j) \leq Th_5$  $B(i,j) = 5$

When $Th_5 < f(i,j) + E(i,j) \leq Th_6$  $B(i,j) = 6$

When $Th_6 < f(i,j) + E(i,j) \leq Th_7$  $B(i,j) = 7$

More specifically, in the case of the example shown in FIG. 15, m (i.j)=98, and the input multi-level data 115 is located between Th1 (113) and Th2 (124). In consequence, the octernary data of B (i, j) is 2.

In that case, octernarization of the object pixel to 2 means that the object pixel is replaced by m (i, j)+21=119, and this generates an octernarizing error of −4=115−119. The generated error is divided into and corrected as a subsequent pixel correction error E2 (i+1, j)=−2 and a subsequent line correction error E1 (i, j+1)=−2. In other words, the two associated pixels on which error correction has been conducted are represented by 25+E2=23 and 130+E1=128, respectively.

So, correction of the error E2 (i, j) generated when the preceding pixel is octernarized and that of the error E1 (i, j) generated when the pixel one line before the object pixel is octernarized are conducted on the object pixel to be octernarized. More specifically, E (i, j)=E1 (i, j)+E2 (i, j).

In the octernarization average density storage method, the input multi-level data is stored as an average density in the form of octernary data on the basis of the above-described principle.

Correction of Octernary Data

Next, data processing required to record the data with a recording device on the basis of the above-described levels from 0 to 7 will be described.

Figure 16:
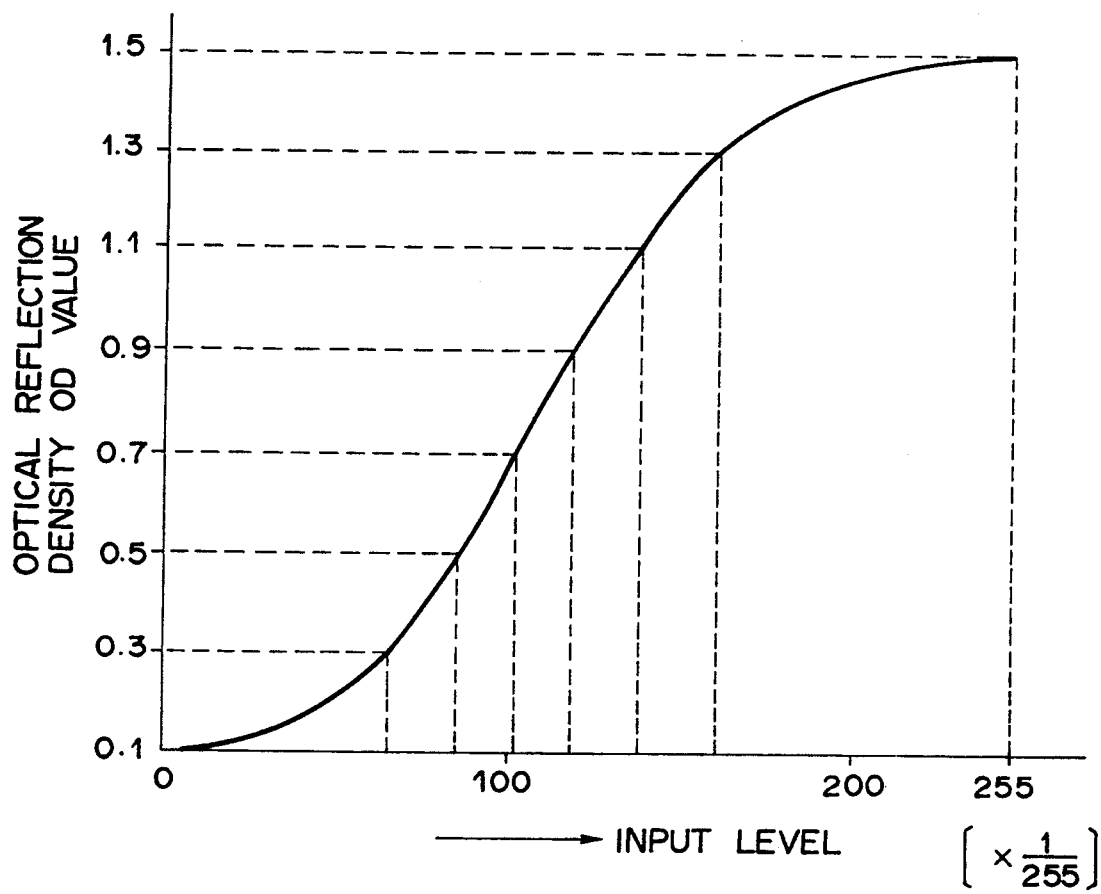
FIG. 16 shows the density characteristics of a laser beam printer.

A so-called laser beam printer (hereinafter referred to as an "LBP") which adopts the pulse-width modulation method is employed. FIG. 16 shows the relation between the pulse width from 0 to 1 of the LBP and the recording density characteristics. Generally, the printer of this type, including an LBP and a thermal printer, is characterized by non-linearity of the recording density relative to an applied energy, so the aforementioned 8 density levels must be related linearly to the optical reflection density OD values so as to reproduce a faithful density. In other words, level 7 and level 0 must represent the highest density value 1.5 and the lowest density value 0.1, respectively, while the intermediate levels must represent the densities ranging from 0.1 to 1.5 in a linear fashion.

Hence, in the case of the example of the recording characteristics shown in FIG. 16, level 0 is converted into a printer input level 0 representing the pulse width 0, and level 1 is converted into an input level 65 representing the pulse width of 65/255 which expresses a density 0.3. Table 3 lists the thus-obtained values as a conversion table.

TABLE 3

| Octernary Level | Printer Input Level |
|---|---|
| 0 | 0 |
| 1 | 65 |
| 2 | 84 |
| 3 | 102 |
| 4 | 118 |
| 5 | 137 |
| 6 | 160 |
| 7 | 255 |

Example of Hardware Configuration of the Octernarization Process Unit)

Figure 17:
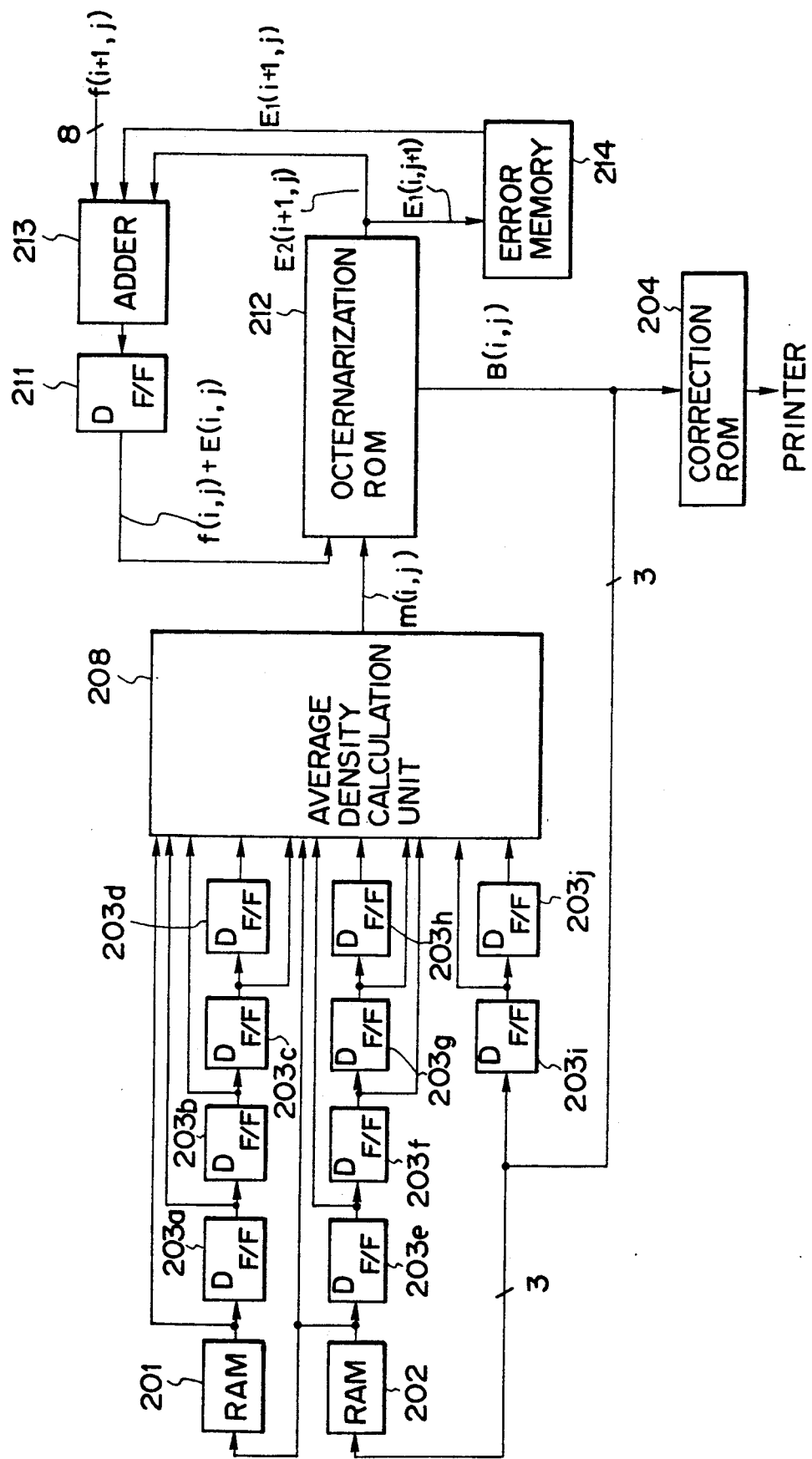
FIG. 17 shows the hardware configuration of a octernarization circuit in the third embodiment.

FIG. 17 is a block diagram of the hardware configuration of the octernarization process unit in the third embodiment.

In FIG. 17, an octernarization ROM 208 performs octernarization operation, which will be described below, using a look-up table. A 3-bit octernary signal, which is output from the octernarization ROM 212, is input to a correction ROM 204 where it is converted into a printer input level shown in Table 3, and to a 3-bit D flip-flop (hereinafter referred to as a DF/F) 203i and a line delay RAM 202. The octernary signal is sequentially shifted and held by 10 DF/Fs and 2 RAMs 201 and 202, and this allows octernary data on 12 pixels located in the vicinity of the object pixel shown in FIG. 15 to be referred at the same time.

The 3-bit data on the 12 pixels is input to an average value calculation unit 208 which performs calculation expressed by Equation . The average value calculation unit 208 is a multiplication/addition circuit comprised of a bit shift and an adder/subtracter for a 3-bit signal. The output of the average value calculation unit 208, i.e., m (i, j), is input to the octernarization ROM 212. The average value calculation unit 208 may also be constructed by a ROM.

Multi-level data which is input and on which error correction has been performed in the manner described later is input to the octernarization ROM 212. The octernarization ROM 212 performs octernarization in accordance with Equation (26) on the basis of 7 different thresholds listed in Table 2 using the look-up table. The octernarization ROM 212 also generates an octernarizing error which is based on any of the 8 different average densities listed in Table 1, i.e., E1 (i, j+1) and E2 (i, j+1), in a similar manner using the translation table. In the octernarizing error E1 (i, j+1) corresponding to the subsequent line pixel is input to an error memory 214 where it is held by clock pulses corresponding to 1 line. Thereafter, E1 (i, j+1) is input to an adder 213 where it is added, together with E2 (i+1, j), to the input data to correct it. Corrected data f (i, j)+E (i, j) is synchronized by a DF/F 211 and is input to an address terminal of the octernarization ROM 212.

In a case where E1 or E2 exceeds ±15, the octernarizing error is zeroed and is not stored. In this way, an edge portion of an input image can be expressed precisely.

Example of Adjustment of Recording Density

An example of adjusting a recording density using a conversion means according to the present invention will be described below with reference to FIG. 18.

Figure 18:
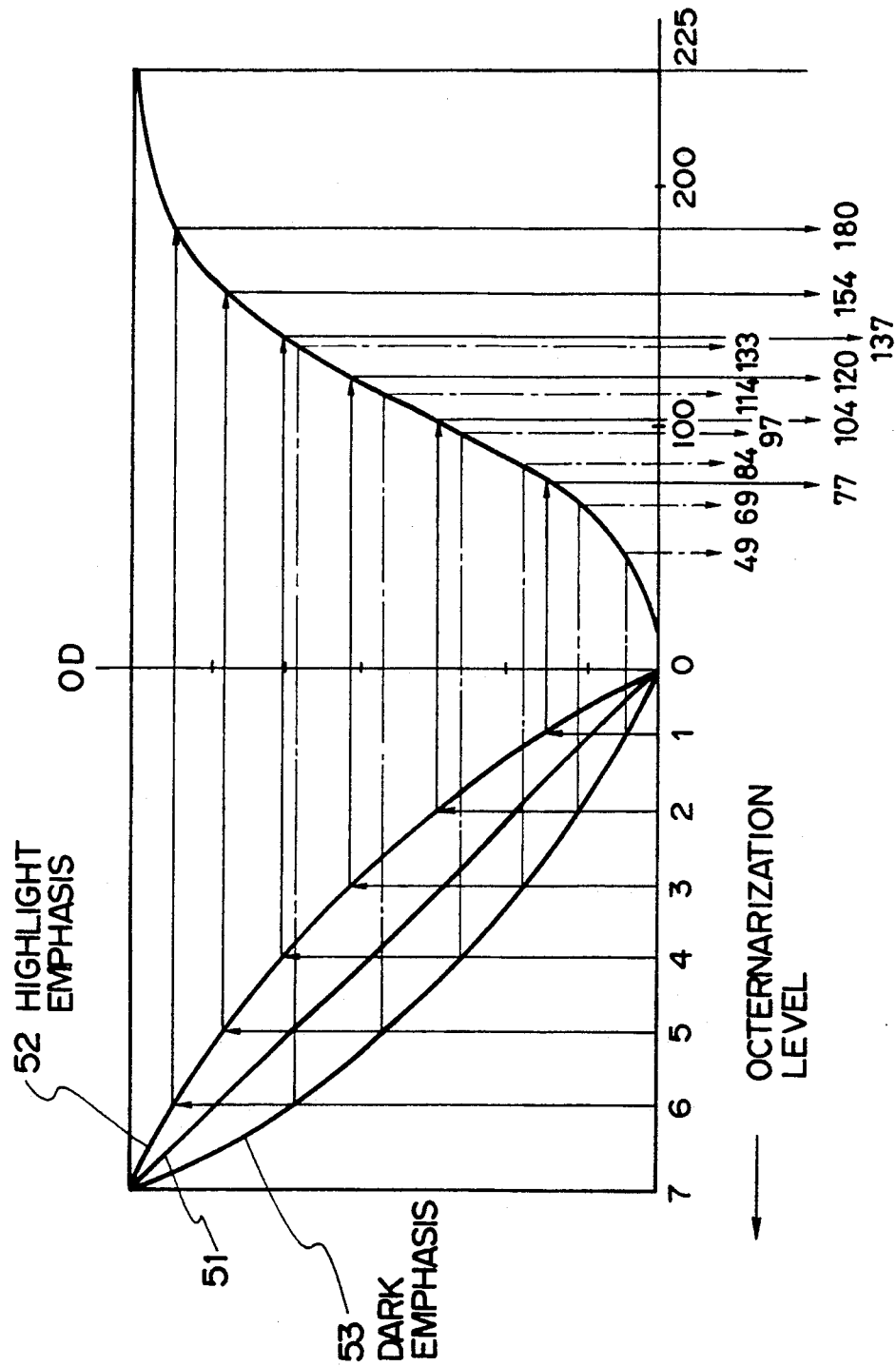
FIG. 18 shows an example of density adjustment in the third embodiment.

FIG. 18 is a graph, the left side of which shows the relation between the octernarized levels and the recording density OD values. A straight line 51 denotes that of this embodiment. In a curve 52 which is convex in an upward direction, emphasis is put on a bright portion in the obtained image. Conversely, if the octernarized levels are related to the recording density OD values in the manner indicated by a curve 53 which is convex in a downward direction, a dark portion is intensified in the obtained image. In other words, by varying the input levels of the printer which are made to correspond to the octernarization levels, recording in a desired image quality can be achieved.

Table 4 lists the printer input levels representing the pulse widths which are employed in both cases.

TABLE 4

| Octernary Level | Highlight Emphasis Level | Dark Emphasis |
|---|---|---|
| 0 | 0 | 0 |
| 1 | 77 | 49 |
| 2 | 104 | 69 |
| 3 | 120 | 84 |
| 4 | 137 | 97 |
| 5 | 154 | 114 |
| 6 | 180 | 133 |
| 7 | 255 | 255 |

Example of Application to Ink Jet System

An example of application of the present invention to the ink jet recording method will be described below.

Figure 19:
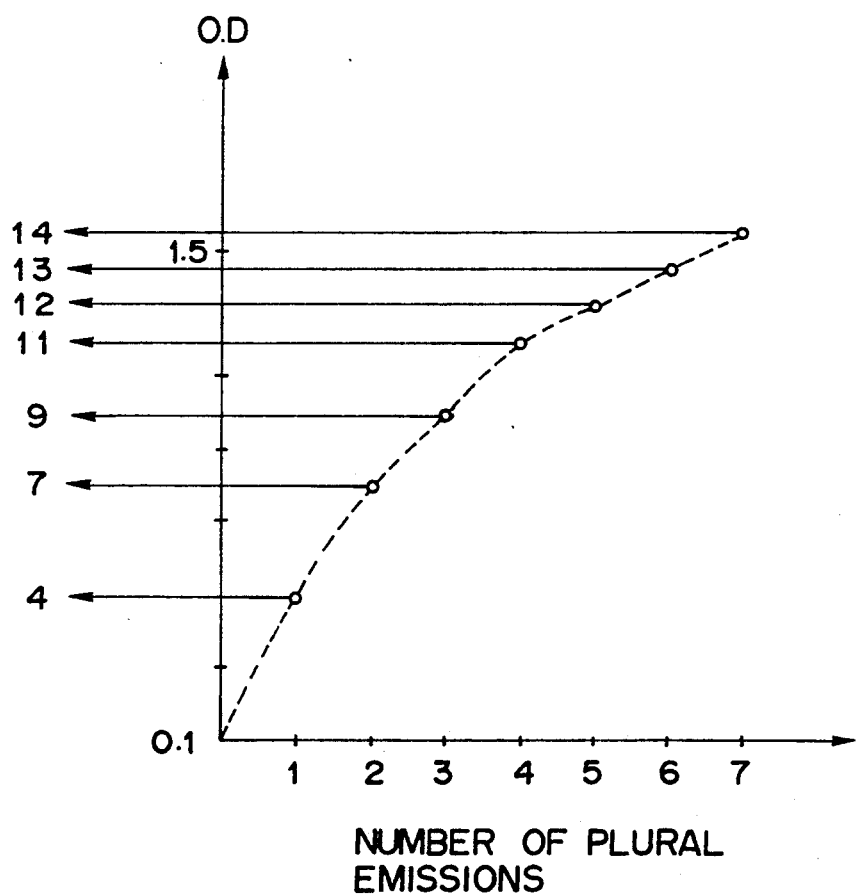
FIG. 19 shows application of the present invention to an inkjet method.

In the recording process of this type, multi-level recording is performed by emitting thin ink onto the same position a plurality of times and thereby modulating the dot area and the density thereof in a false fashion. FIG. 19 shows typical recording characteristics. In the case shown in FIG. 19, non-linearity of the recording process cannot be corrected by the same data transformation as that employed in the aforementioned embodiments. Hence, 3-bit data which is output from the octernarization ROM 212 shown in FIG. 17 is converted non-linearly, and the average value calculation is conducted on the converted data. More specifically, the octernary data are converted to values from 0 to 14 which are proportionate to the OD values relative to the number of plural emissions, as shown in FIG. 19 and in Table 5.

TABLE 5

| Octernarization Level | Converted Value |
|---|---|
| 0 | 0 |
| 1 | 4 |
| 2 | 7 |
| 3 | 9 |
| 4 | 11 |
| 5 | 12 |
| 6 | 13 |
| 7 | 14 |

Figure 20:
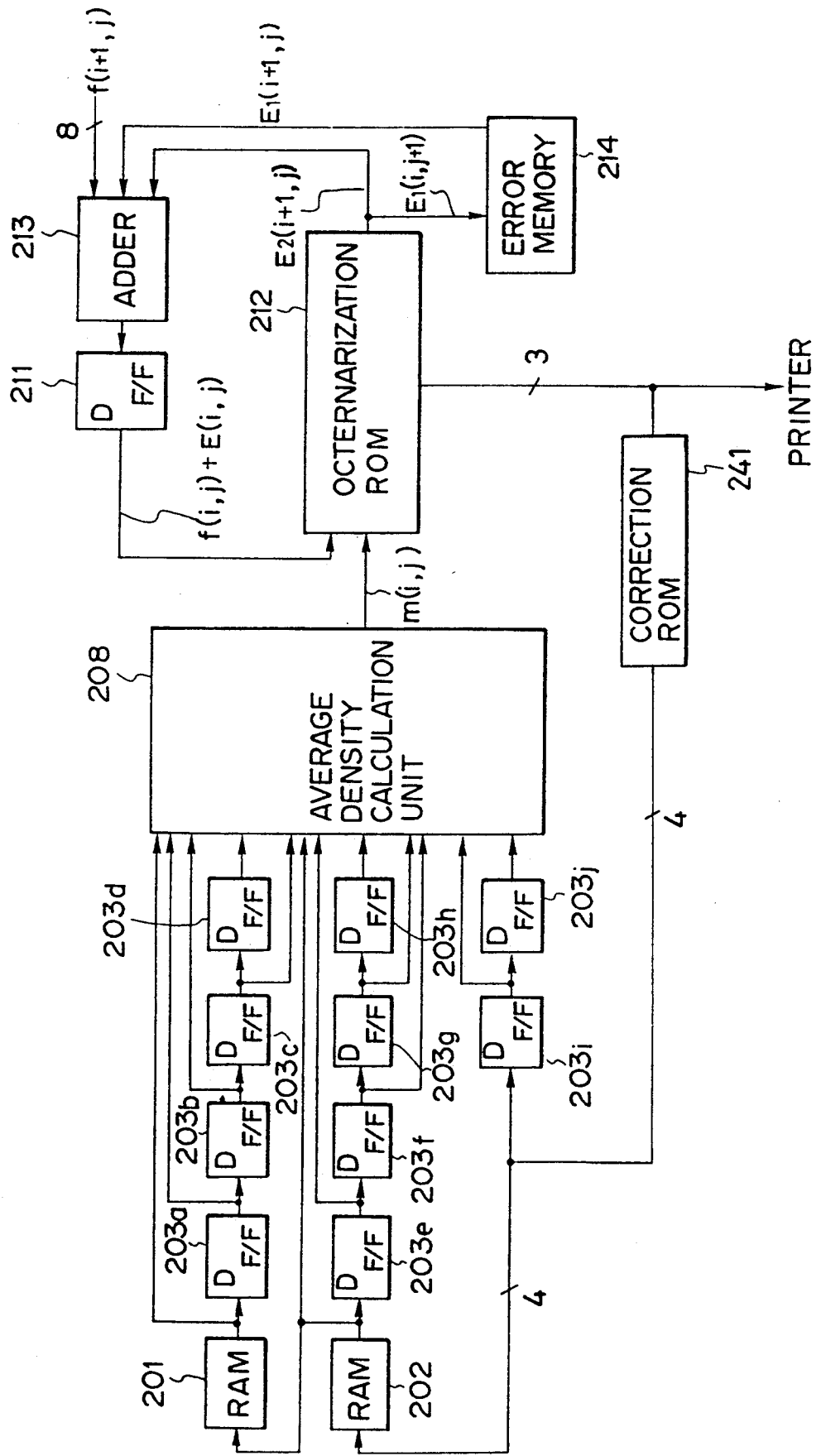
FIG. 20 shows the hardware configuration of an octernarization process employed in the ink jet method.

If it is desired that the same subsequent process is performed, the results of the average value calculation performed on the converted data in accordance with Equation (25) are multiplied by $\frac{1}{2}$. FIG. 20 shows an example of the hardware which may be employed in that case. A correction ROM 241 performs the above-described data conversion shown in Table 5. Other configuration and operation are the same as those shown in FIG. 17.

Other Examples of Average Density and of Threshold

The above-described effect may also be attained by non-linear allocation of the 7 different types of average densities shown in Table 1. More specifically, in the aforementioned embodiment, the average value 73 allocated to the object pixel is uniformly distributed to 8 levels. However, the non-linearity shown in FIG. 19 may be corrected by determining the average densities, as shown in, for example, Table 6, and by performing the octernarization process using the thresholds shown in, for example, Table 7. This is achieved within the octernarization ROM without providing another correction ROM, so the hardware can be made simple.

TABLE 6

| B (i, j) | Average Density |
|---|---|
| 0 | m (i, j) + 0 |
| 1 | m (i, j) + 21 |
| 2 | m (i, j) + 36 |
| 3 | m (i, j) + 47 |
| 4 | m (i, j) + 57 |
| 5 | m (i, j) + 63 |
| 6 | m (i, j) + 68 |
| 7 | m (i, j) + 73 |

TABLE 7

| Threshold | |
|---|---|
| Th0 | m (i, j) + 10 |
| Th1 | m (i, j) + 29 |
| Th2 | m (i, j) + 42 |
| Th3 | m (i, j) + 52 |
| Th4 | m (i, j) + 60 |
| Th5 | m (i, j) + 66 |
| Th6 | m (i, j) + 71 |

The weights of the weighting mask, the mask size, and the number of octernarization levels are not limited to this embodiment.

As will be understood from the foregoing description, the third embodiment is an image processing apparatus which is capable of performing pseudo halftone process that can substitute for the error diffusion method at a low cost.

Furthermore, pseudo contour generated by the octernarization conducted in the error diffusion method is eliminated, and a high-quality image can be obtained.

Furthermore, a density which is more faithful to that of an original can be reproduced utilizing the characteristics of the recording device employed.

What is claimed is:

1. An image processing apparatus, comprising:
   an input means for inputting data on an object pixel;
   an calculation means for calculating an average density value of a predetermined area; and
   a quantization means for converting the data on the object pixel into multi-level data on the basis of the average density value obtained by said calculation means,
   wherein said calculation means calculates the average density value of the predetermined area using multi-level data produced previously by said quantization means.

2. An image processing apparatus according to claim 1, wherein said calculation means calculates the average density value for the object pixel by using the data of an immediately preceding object pixel which has already been quantized into a plurality of multi-level data.

3. An image processing apparatus according to claim 2, wherein said quantization means calculates, for the object pixel, a threshold from the average density value for that object pixel and converts the data on the object pixel into the multi-level data on the basis of the threshold.

4. An image processing apparatus according to claim 1, further comprising a correction means for correcting an error generated when the data on said object pixel is converted into the multi-level data.

5. An image processing apparatus according to claim 4, wherein said correction means corrects a difference between the data on said object pixel which is input and the average density value which is obtained by quantizing the data on said object pixel as the error.

6. An image processing apparatus according to claim 4, wherein said correction means corrects the error when said error is within a predetermined value.

7. An image processing apparatus according to claim 1, wherein said calculation means calculates the average density value using data consisting of a bit deleted from those of the multi-level data consisting of a plurality of bits and obtained by said quantization means.

8. An image processing apparatus according to claim 1, further comprising a recording means for recording an image on the basis of said multi-level data, and a conversion means for converting said multi-level data and thereby correcting non-linear characteristics of said recording means.

9. An image processing apparatus, comprising:
an input means for inputting data on an object pixel;
a calculation means for calculating an average density value of a predetermined area;
a quantization means for converting the data on said object pixel into multi-level data on the basis of the average density value obtained by said calculation means; and
a correcting means for correcting an error generated when the data of said object pixel is converted into the multi-level data.

10. An image processing apparatus according to claim 9, wherein said calculating means calculates the average density value for the object pixel by using the data of an immediately preceding object pixel which has already been quantized into a plurality of multi-level data.

11. An image processing apparatus according to claim 10, wherein said quantization means calculates, for the object pixel, a threshold from the average density value for that object pixel and converts the data on the object pixel into the multi-level data on the basis of the threshold.

12. An image processing apparatus according to claim 9, wherein said correction means corrects a difference between the data on said object pixel which is input and the average density value which is obtained by quantizing the data on said object pixel as the error.

13. An image processing apparatus according to claim 9, wherein said correction means corrects the error when said error is within a predetermined value.

14. An image processing apparatus according to claim 9, wherein said calculation means calculates the average density value using data consisting of a bit deleted from those of the multi-level data consisting of a plurality of bits and obtained by said quantization means.

15. An image processing apparatus according to claim 9, further comprising a recording means for recording an image on the basis of said multi-level data, and a conversion means for converting said multi-level data and thereby correcting nonlinear characteristics of said recording means.

16. An image processing apparatus, comprising:
an input means for inputting data on an object pixel;
a calculation means for calculating an average density value of a predetermined area;
a quantization means for converting the data on said object pixel into multi-level data consisting of a plurality of bits on the basis of the average density value obtained by said calculation means; and
a correction means for correcting an error generated when the data on said object pixel is converted into the multi-level data,
wherein said calculation means calculates the average density value of the predetermined area using data consisting of a bit deleted from those of the multi-level data consisting of a plurality of bits and obtained by said quantization means.

17. An image processing apparatus according to claim 16, wherein said calculation means calculates the average density value for the object pixel by using the data of an immediately preceding object pixel which has already been quantized into a plurality of multi-level data.

18. An image processing apparatus according to claim 17, wherein said quantization means calculates, for the object pixel, a threshold from the average density value for that object pixel and converts the data on the object pixel into the multi-level data on the basis of the threshold.

19. An image processing apparatus according to claim 16, wherein said correction means corrects a difference between the data on said object pixel which is input and the average density value which is obtained by quanternarizing the data on said object pixel as the error.

20. An image processing apparatus according to claim 16, wherein said correction means corrects the error when said error is within a predetermined value.

21. An image processing apparatus according to claim 16, further comprising a recording means for recording an image on the basis of said multi-level data, and a conversion means for converting said multi-level data and thereby correcting nonlinear characteristics of said recording means.

22. An image processing apparatus, comprising:
an average density calculation means for calculating an average density on the basis of a plurality of re-quantized data on the pixels in the vicinity of an object pixel which have already been re-quantized so that they take at least 3 levels;
a threshold calculation means for calculating a plurality of thresholds on the basis of said average density;
a re-quantization means for re-quantizing multi-level image data to image data that can take at least 3 levels on the basis of said plurality of thresholds; and
a conversion means for converting the re-quantized image data in accordance with nonlinear characteristics of a recording means.

23. An image processing apparatus according to claim 22, further comprising an error diffusion means for diffusing an error generated by the re-quantization conducted by said re-quantization means to pixels which will be re-quantized later.

24. An image processing apparatus, comprising:
a re-quantization means for re-quantizing multi-level image data to image data that can take at least 3 levels on the basis of a plurality of re-quantized data on the pixels in the vicinity of an object pixel which have already been re-quantized; and
a recording signal output means for nonlinearly converting the re-quantized image data in accordance with density characteristics of an image recording means connected to said re-quantizing means and for outputting it to said image recording means.

25. An image processing apparatus according to claim 24, wherein said re-quantizing means includes an error diffusion means for diffusing an error caused by the re-quantization to pixels which will be re-quantized later.

26. An image processing apparatus, comprising:
an input means for inputting data on an object pixel;
a calculation means for calculating an average density value of a predetermined area; and
a quantization means for converting the data on the object pixel into multi-level data on the basis of the average density value obtained by said calculation means,
wherein said calculation means calculates the average density value for the object pixel by using the data of an immediately preceding object pixel which has already been quantized into a plurality of multi-level data.

27. An image processing apparatus, comprising:
an input means for inputting data on an object pixel;
a calculation means for calculating an average density value of a predetermined area; and
a quantization means for converting the data on the object pixel into multi-level data on the basis of the average density value obtained by said calculation means,
wherein said calculation means calculates the average density value using data previously output by said quantization means, from which data a bit has been deleted.

28. An image processing apparatus, comprising:
input means for inputting data on an object pixel;
calculation means for calculating an average density value of a predetermined area;
quantization means for converting the data on the object pixel into multi-level data on the basis of the average density value obtained by said calculation means;
recording means for recording an image on the basis of the multi-level data; and
conversion means for converting the multi-level data to correct for non-linear characteristics of said recording means.

29. An image processing apparatus, comprising:
quantization means for quantizing input image data into data of at least three gradations;
data conversion means for operating on a plurality of quantization data for pixels adjacent to an object pixel, the quantization data having been quantized into at least three gradations; and
average density calculation means for calculating an average density on the basis of the data operated on by said data conversion means,
wherein said data conversion means converts the quantization data into non-linear data in accordance with characteristics of a recording means.

30. An image processing method, comprising the steps of:
inputting data on an object pixel;
calculating an average density value of a predetermined area;
converting the data on the object pixel into multi-level data on the basis of the average density value obtained in said calculating step; and
correcting an error generated when the data of the object pixel is converted into the multi-level data.

31. An image processing apparatus, comprising:
input means for inputting data on an object pixel;
calculation means for calculating an average density value of a predetermined area;
quantization means for converting the data on the object pixel into data having a number of levels which is less than that of the input data, on the basis of the average density value obtained by said calculation means; and
correction means for correcting an error generated when the data of the object pixel is converted into the data the level number of which is less than that of the input data.

32. An image processing method, comprising the steps of:
inputting data on an object pixel;
calculating an average density value of a predetermined area;
converting the data on the object pixel into data having a number of levels which is less than that of the input data, on the basis of the average density value obtained for said calculation step; and
correcting an error generated when the data of the object pixel is converted into the data the level number of which is less than that of the input data.

* * * * *

UNITED STATES PATENT AND TRADEMARK OFFICE
CERTIFICATE OF CORRECTION

PATENT NO. : 5,121,446

DATED : June 9, 1992

INVENTOR(S) : YASUHIRO YAMADA, ET AL.

Page 1 of 9

It is certified that error appears in the above-identified patent and that said Letters Patent is hereby corrected as shown below:

ON THE TITLE PAGE:

<u>IN [56] REFERENCES CITED</u>

Under U.S. PATENT DOCUMENTS, insert:

```
-- 5,008,950   1 /1991   Katayama et al. .......... 382/50
   4,975,786  12/1990   Katayama et al. .......... 358/459
   4,958,218   9/1990   Katayama et al. .......... 358/75
   4,958,238   9/1990   Katayama et al. .......... 358/456
   4,958,236   9/1990   Nagashima et al. ......... 358/445
   4,876,610  10/1989   Ohsawa et al. ............ 358/443
   4,878,125  10/1989   Katayama et al. .......... 358/443 --.
```

Insert:     -- FOREIGN PATENT DOCUMENTS

```
    0248616  12/1987   European Pat. Off. .
    0174721   3/1986   European Pat. Off. .
  60-214160  10/1985   Japan . --
```

IN THE DRAWINGS

<u>SHEET 3 OF 19</u>

FIG. 3, "QUATERNARIZATION" should read --QUATERNIZATION--.

<u>SHEET 13 OF 19</u>

FIG. 14, "OCTERNARIZATION" (both occurrences) should read --OCTONARIZATION-- and "OCTERNARY" should read --OCTONARY--.

<u>SHEET 14 OF 19</u>

FIG. 15, "OCTERNARIZATION" should read --OCTONARIZATION--.

UNITED STATES PATENT AND TRADEMARK OFFICE
CERTIFICATE OF CORRECTION

PATENT NO. : 5,121,446
DATED : June 9, 1992
INVENTOR(S) : YASUHIRO YAMADA, ET AL.

It is certified that error appears in the above-identified patent and that said Letters Patent is hereby corrected as shown below:

<u>SHEET 16 OF 19</u>

FIG. 17, "OCTERNARIZATION" should read --OCTONARIZATION--.

<u>SHEET 17 OF 19</u>

FIG. 18, "OCTERNARIZATION" should read --OCTONARIZATION--.

<u>SHEET 19 OF 19</u>

FIG. 20, "OCTERNARIZATION" should read --OCTONARIZATION--.

<u>COLUMN 3</u>

Figure 13A:
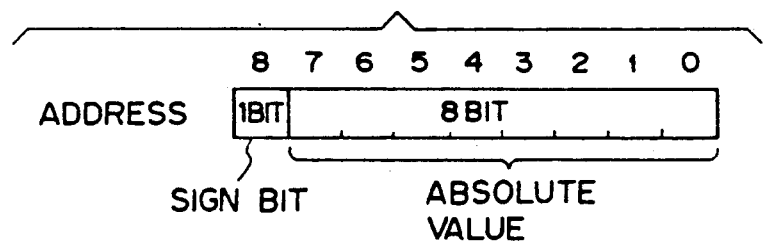
FIG. 13(a)-13(b) the form of I/O data of the ROM 26 shown in FIG. 10.
Figure 13B:
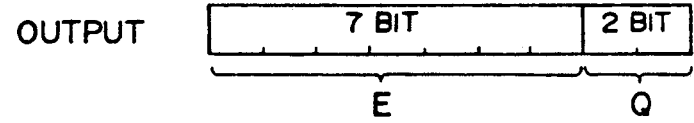

Line 21, "FIG. 13(a)-13(b)" should read
           --FIG. 13(a)-13(b) show--.
    Line 35, "inkjet" should read --ink-jet--.
    Line 37, "ink jet" should read --ink-jet--.
           "octernarization" should read --octonarization--.

<u>COLUMN 4</u>

Line 11, "1" should read -- ① --.
    Line 16, "2" should read -- ② --.
    Line 21, "3" should read -- ③ --.
    Line 25, "4" should read -- ④ --.
    Line 42, "5" should read -- ⑤ --.
    Line 46, "6" should read -- ⑥ --.
    Line 50, "7" should read -- ⑦ --.
    Line 54, "8" should read -- ⑧ --.
    Line 52, "m2(i,j) + m2(i,j)" should read
           --m2(i,j) + m3(i,j)--.

UNITED STATES PATENT AND TRADEMARK OFFICE
CERTIFICATE OF CORRECTION

PATENT NO. : 5,121,446
DATED : June 9, 1992
INVENTOR(S) : YASUHIRO YAMADA, ET AL.

Page 3 of 9

It is certified that error appears in the above-identified patent and that said Letters Patent is hereby corrected as shown below:

COLUMN 5

Line 8, "from" should read --form--.
Line 48, "substracter 9" should read --subtracter 9--.

COLUMN 6

Line 43, "m2(i,j)=m0(i,j)+⅔R(0,0)=m1(i,j)+⅓R(0,0)"
should read
--m2(i,j)=m0(i,j)+⅔R(0,0)=m1(i,j)+⅓R(0,0)   ⑩--.
Line 45, "m3(i,j)=m0(i,j)+R(0,0)=m2(i,j)+⅓R(0,0)"
should read
--m3(i,j)=m0(i,j)+R(0,0)=m2(i,j)+⅓R(0,0)   ⑪--.
Line 53, "12" should read -- ⑫ --.

COLUMN 7

Line 45, "6'" should read -- ⑥' --.
Line 49, "7'" should read -- ⑦' --.
Line 54, " ⑧ " should read -- ⑧' --.
Line 62, "quaternarizing" should read --quaternizing--.

COLUMN 9

Line 48, "quaternarized." should read --quaternized.-- and
--Quaternarization" should read --Quaternization--.
Line 50, "quaternarized," should read --quaternized,--.
Line 51, "ernarization" should read --ernization--.
Line 54, "quaterna-" should read --quaterni- --.
Line 55, "rizing" should read --zing--.
Line 64, "13" should read -- ⑬ --.
Line 67, "quaternarizing" should read --quaternizing--.

UNITED STATES PATENT AND TRADEMARK OFFICE
CERTIFICATE OF CORRECTION

PATENT NO. : 5,121,446
DATED : June 9, 1992
INVENTOR(S) : YASUHIRO YAMADA, ET AL.

It is certified that error appears in the above-identified patent and that said Letters Patent is hereby corrected as shown below:

COLUMN 10

Line 1, "quaternarization" should read --quaternization--.
Line 5, "14" should read -- (14) --.
Line 10, "$M_1(i,j)=M_0(i,j)+\frac{1}{3}R(0,0)$ where $Q(i,j)=\frac{1}{3}$" should read
--$M_1(i,j)=M_0(i,j)+\frac{1}{3}R(0,0)$ where $Q(i,j)=\frac{1}{3}$ (15) --.
Line 12, "$M_2(i,j)=M_0(i,j)+\frac{2}{3}R(0,0)$ where $(Q(i,j)=\frac{2}{3}$" should read
--$M_2(i,j)=M_0(i,j)+\frac{2}{3}R(0,0)$ where $(Q(i,j)=\frac{2}{3}$ (16) --.
Line 14, "$M_3(i,j)=M_0(i,j)+R(0,0)$ where $Q(i,j)=1$" should read
--$M_3(i,j)=M_0(i,j)+R(0,0)$ where $Q(i,j)=1$ (17) --.
Line 16, "quaternarizing" should read --quaternizing--.
Line 20, "18" should read -- (18) --.
Line 22, "19" should read -- (19) --.
Line 25, "20" should read -- (20) --.
Line 27, "quaternarized" should read --quaternized--.
Line 31, "21" should read -- (21) --.
Line 38, "$Q(i,j)=\frac{1}{3}, E(i,j+1)=f(i,j)+E(i,j)-M_0(i,j)-\frac{1}{3}R(0,0)$" should read
--$Q(i,j)=\frac{1}{3}, E(i,j+1)=f(i,j)+E(i,j)-M_0(i,j)-\frac{1}{3}R(0,0)$ (22) --.
Line 46, "$Q(i,j)=\frac{2}{3}, E(i,j+1)=f(i,j)+E(i,j)=M_0(i,j)-\frac{2}{3}R(0,0)$" should read
--$Q(i,j)=\frac{2}{3}, E(i,j+1)=f(i,j)+E(i,j)=M_0(i,j)-\frac{2}{3}R(0,0)$ (23) --.
Line 54, "$Q(i,j)=1, E(i,j+1)=f(i,j)+E(i,j)-M_0(i,j)-R(0,0)$" should read
--$Q(i,j)=1, E(i,j+1)=f(i,j)+E(i,j)-M_0(i,j)-R(0,0)$ (24) --.
Line 57, "quaternarizing" should read --quaternizing--.
Line 58, "Equations    to    ." should read
--Equations (13) to (24) .--.
Line 59, "narizing" should read --nizing--.

UNITED STATES PATENT AND TRADEMARK OFFICE
CERTIFICATE OF CORRECTION

PATENT NO.  : 5,121,446

DATED       : June 9, 1992

INVENTOR(S) : YASUHIRO YAMADA, ET AL.

It is certified that error appears in the above-identified patent and that said Letters Patent is hereby corrected as shown below:

COLUMN 10

Line 61, "quaternarized." should read --quaternized.-- and --quaternarization" should read --quaternization--.
Line 66, "quaternarized." should read --quaternized.--.
Line 68, "quaternarizing" should read --quaternizing--.

COLUMN 11

Line 2, "quaternarization" should read --quaternization--.
Line 4, "quaternarizing" should read --quaternizing--.
Line 5, "quaternarized." should read --quaternized.--.
Line 7, "quaternarization" should read --quaternization--.
Line 14, "quaternarized." should read --quaternized.--.
Line 15, "quaternarizing" should read --quaternizing--.
Line 18, "narization" should read --nization--.
Line 27, "Equations   and   to" should read --Equations (13) and (18) to-- and "quaternarizing" should read --quaternizing--.
Line 29, "quaternarizing" should read --quaternizing--.
Line 34, "Equation   ." should read --Equation (21).--.
Line 36, "quaternarized " should read --quaternized --
Line 39, "Equations  to   as" should read --Equations (21) to (24) as--.
Line 43, "narizing" should read --nizing--.

UNITED STATES PATENT AND TRADEMARK OFFICE
CERTIFICATE OF CORRECTION

PATENT NO. : 5,121,446
DATED : June 9, 1992
INVENTOR(S) : YASUHIRO YAMADA, ET AL.

It is certified that error appears in the above-identified patent and that said Letters Patent is hereby corrected as shown below:

COLUMN 12

Line 5, "quaternarized." should read --quaternized.--.
Line 20, "quaternarized" should read --quaternized--.
Line 33, "quaternarized." should read --quaternized.--
Line 66, "$\frac{3}{5}$ E(i,j+1)" should read --$\frac{3}{4}$ E(i,j+1)--.

COLUMN 13

Line 27, "requires" should read --required--.
Line 43, "octernarization" should read --octonarization--.
Line 44, "octernary" should read --octonary--.
Line 45, "octernary" should read --octonary--.
Line 46, "octernary" should read --octonary--.
Line 48, "octernarization" should read --octonarization--.
Line 53, "octernarization" should read --octonarization--.
Line 54, "octernarization" should read --octonarization--.
Line 55, "octernarization." should read --octonarization.--.
Line 57, "ernarization" should read --onarization--.
Line 59, "Octernarization" should read --Octonarization--.
Line 61, "octernarization" should read --octonarization--.
Line 65, "octer" should read --octo--.
Line 66, "octernarized" should read --octonarized--.
Line 68, "octernary" should read --octonary--.

COLUMN 14

Line 3, "octernarized" should read --octonarized--.
Line 4, "Equation   and" should read --Equation (25) and--.
Line 5, "bas" should read --basis--.
Line 8, "octernarization" should read --octonarization--.
Line 11, "octernarizing" should read --octonarizing--.

UNITED STATES PATENT AND TRADEMARK OFFICE
CERTIFICATE OF CORRECTION

PATENT NO. : 5,121,446
DATED : June 9, 1992
INVENTOR(S) : YASUHIRO YAMADA, ET AL.

It is certified that error appears in the above-identified patent and that said Letters Patent is hereby corrected as shown below:

COLUMN 14

Line 12, "octerna-" should read --octona- --.
Line 14, "octernarization" should read --octonarization--.
Line 18, "25" should read -- (25) --.
Line 24, "octernary" should read --octonary--.
Line 33, "octernary" should read --octonary--.
Line 38, "octernarized" should read --octonarized--.
Line 41, "octernary" should read --octonary--.
Line 43, "octernary" should read --octonary--.
Line 56, "octer-" should read --octo- --.

COLUMN 15

Line 6, "Equation" should read --Equation (26) --.
Line 9, "26" should read -- (26) --.
Line 25, "octernary" should read --octonary--.
Line 26, "octernarization" should read --octonarization--.
Line 28, "octernarizing" should read --octonarizing--.
Line 37, "octernarized" should read --octonarized--.
Line 39, "octernarized" should read --octonarized--.
Line 40, "octernarized." should read --octonarized.--.
Line 42, "octernarization" should read --octonarization--.
Line 44, "octernary" should read --octonary--.
Line 47, "Octernary" should read --Octonary--.

COLUMN 16

Line 7, "Octernary" should read --Octonary--.
Line 19, "Octernarization" should read --Octonarization-- and "Unit)" should read --Unit--.
Line 21, "octernarization" should read --octonarization--.

UNITED STATES PATENT AND TRADEMARK OFFICE
CERTIFICATE OF CORRECTION

PATENT NO. : 5,121,446
DATED : June 9, 1992
INVENTOR(S) : YASUHIRO YAMADA, ET AL.

It is certified that error appears in the above-identified patent and that said Letters Patent is hereby corrected as shown below:

COLUMN 16

Line 23, "octernarization" should read --octonarization--.
Line 24, "octernarization" should read --octonarization--.
Line 25, "octernary" should read --octonary--.
Line 26, "octernarization" should read --octonarization--.
Line 31, "octernary" should read --octonary--.
Line 33, "octernary" should read --octonary--.
Line 38, "Equation  ." should read --Equation ㉕ .--.
Line 42, "octernarization" should read --octonarization--.
Line 48, "octernarization" should read --octonarization--.
Line 49, "ernarization" should read --onarization-- and "octernarization" should read --octonarization--.
Line 52, "octernarization" should read --octonarization-- and "octernariz-" should read --octonariz- --.
Line 56, "octernarizing" should read --octonarizing--.
Line 65, "octerna-" should read --octona- --.
Line 64, "octernarization" should read --octonarization--.

COLUMN 17

Line 7, "octernarized" should read --octonarized--.
Line 11, "octernarized" should read --octonarized--.
Line 17, "octernarization" should read --octonarization--.
Line 22, "Octernary" should read --Octonary--.
Line 33, "Ink Jet" should read --Ink-jet--.
Line 35, "ink jet" should read --ink-jet--.
Line 44, "octer-" should read --octo- --.
Line 48, "octernary" should read --octonary--.
Line 54, "Octernarization" should read --Octonarization--.

UNITED STATES PATENT AND TRADEMARK OFFICE
CERTIFICATE OF CORRECTION

PATENT NO. : 5,121,446
DATED : June 9, 1992
INVENTOR(S) : YASUHIRO YAMADA, ET AL.

It is certified that error appears in the above-identified patent and that said Letters Patent is hereby corrected as shown below:

COLUMN 18

Line 15, "octernarization" should read --octonarization--.
Line 17, "octernarization" should read --octonarization--.
Line 33, "Threshold" should read
--Threshold    Average Density--.
Line 42, "octernarization" should read --octonarization--.
Line 49, "octer" should read --octo--.
Line 59, "an" (first occurrence) should read --a--.

COLUMN 19

Line 47, "calculating means" should read
--calculation means--.

COLUMN 20

Line 42, "quanternarizing" should read --quaternizing--.

Signed and Sealed this

Fourteenth Day of December, 1993

Attest:

BRUCE LEHMAN

Attesting Officer     Commissioner of Patents and Trademarks